US009515939B2

(12) United States Patent
Kodama

(10) Patent No.: US 9,515,939 B2
(45) Date of Patent: Dec. 6, 2016

(54) APPARATUS AND METHOD FOR CONTROLLING A WINDOW SIZE OF PACKET TRANSMISSION BASED ON A FREE SPACE OF BUFFER

(71) Applicant: FUJITSU LIMITED, Kawasaki-shi, Kanagawa (JP)

(72) Inventor: Takeshi Kodama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 14/530,243

(22) Filed: Oct. 31, 2014

(65) Prior Publication Data

US 2015/0131440 A1 May 14, 2015

(30) Foreign Application Priority Data

Nov. 12, 2013 (JP) ................................ 2013-234440

(51) Int. Cl.
*G01R 31/08* (2006.01)
*H04L 12/815* (2013.01)
*H04L 12/807* (2013.01)
*H04L 12/835* (2013.01)

(52) U.S. Cl.
CPC ............. *H04L 47/225* (2013.01); *H04L 47/27* (2013.01); *H04L 47/30* (2013.01)

(58) Field of Classification Search
CPC ......... H04L 47/225; H04L 47/27; H04L 47/30
See application file for complete search history.

(56) References Cited

U.S. PATENT DOCUMENTS

| 4,677,616 A | * | 6/1987 | Franklin | H04L 47/10 370/423 |
| 5,163,046 A | * | 11/1992 | Hahne | H04L 47/10 370/237 |
| 6,167,027 A | * | 12/2000 | Aubert | H04L 12/2854 370/230 |
| 6,907,042 B1 | * | 6/2005 | Oguchi | H04L 47/30 370/230 |
| 2006/0067222 A1 | | 3/2006 | Endoh | |
| 2010/0061240 A1 | * | 3/2010 | Sindhu | H04L 49/1515 370/235 |
| 2011/0019555 A1 | * | 1/2011 | Gotoh | H04W 52/0241 370/252 |
| 2013/0315139 A1 | * | 11/2013 | Abraham | H04B 7/0452 370/328 |
| 2015/0131440 A1 | * | 5/2015 | Kodama | H04L 47/225 370/231 |

FOREIGN PATENT DOCUMENTS

| JP | 2005-277704 | 10/2005 |
| JP | 2006-101339 | 4/2006 |
| JP | 2006-211015 | 8/2006 |

* cited by examiner

*Primary Examiner* — Robert Wilson
(74) *Attorney, Agent, or Firm* — Staas & Halsey LLP

(57) ABSTRACT

A communication device includes a buffer that stores transmission packets. The communication device monitors a free space of the layer 2 transmission buffer. The communication device changes a first window size that is notified from another communication device, to a second window size, based on the free space, and controls an inflow of the transmission packets to the layer 2 transmission buffer, in accordance with the second window size. By providing above-mentioned communication device and a packet control method, a reduction in a throughput caused by overflow in layer 2 transmission buffer is avoided.

10 Claims, 17 Drawing Sheets

APPARATUS AND METHOD FOR CONTROLLING A WINDOW SIZE OF PACKET TRANSMISSION BASED ON A FREE SPACE OF BUFFER

CROSS-REFERENCE TO RELATED APPLICATION

This application is based upon and claims the benefit of priority of the prior Japanese Patent Application No. 2013-234440, filed on Nov. 12, 2013, the entire contents of which are incorporated herein by reference.

FIELD

The embodiments discussed herein are related to apparatus and method for controlling a window size of packet transmission based on a free space of buffer.

BACKGROUND

As one of protocols that are used as a standard in the Internet, there is a transmission control protocol (TCP). Since reliability of communication in the TCP is obtained by an acknowledgement (ACK), the reliability of communication is high as compared with a user datagram protocol (UDP), whereas the throughput is low. In order to compensate the problem, in the TCP, flow control is performed using "window size". Here, "window size" is an amount of data that is allowed to be transmitted at a time without waiting for an ACK. The window size is notified from a reception device to a transmission device, and the transmission device may transmit a plurality of data packets at a time using the window size as an upper limit without waiting for an ACK. Therefore, by using the window size, a reduction in the throughput due to employment of an ACK may be suppressed. In addition, the window size is determined based on a free space of a reception buffer of the reception device, and the window size is reduced as the free space of the reception buffer becomes smaller. As a result, a reduction in the throughput is suppressed while overflow of the reception buffer is avoided.

Japanese Laid-open Patent Publication No. 2005-277704, Japanese Laid-open Patent Publication No. 2006-101339, and Japanese Laid-open Patent Publication No. 2006-211015 are related arts.

Here, in the transmission of a data packet, the transmission device stores generated data packets in a layer 2 transmission buffer once, and transmits the stored data packets to a network. Therefore, when the large amount of data packets flows into the layer 2 transmission buffer at a time, and the transmission of the data packets to the network is delayed, it is probable that overflow of the layer 2 transmission buffer occurs undesirably. In addition, as an upper limit of a generation amount of the data packets, a window size that is notified from the reception device to the transmission device is used. The window size is determined based on the free space of the reception buffer of the reception device. That is, even when the generation amount of the data packets is kept to be the window size or less, it is probable that overflow of the layer 2 transmission buffer occurs undesirably.

In the communication using the TCP, for example, overflow of the layer 2 transmission buffer occurs in the following case. FIGS. 1A, 1B, and 1C are diagrams illustrating a problem of a communication system in a related art. Here, a case is described as an example, in which the transmission side of a data packet corresponds to a communication terminal, and the transmission side of an ACK packet for the data packet corresponds to a base station. The communication terminal and the base station are coupled to each other through a wireless network.

For example, as illustrated in FIG. 1A, when the communication between the communication terminal and the base station is cut off momentarily because the communication terminal is temporarily out of coverage such as behind a building, ACK packets that are to be delivered to the communication terminal reside in a layer 2 transmission buffer B of the base station. In addition, since the communication terminal is not allowed to transmit a data packet to the network, the data packets reside in a layer 2 transmission buffer A of the communication terminal.

After that, as illustrated in FIG. 1B, when the communication is recovered, a large number of ACK packets that have been retained in the layer 2 transmission buffer B is burst-transmitted to the communication terminal at once.

Since the communication terminal generates a new data packet each time an ACK packet is received, a large number of data packets are burst-generated and flow into the layer 2 transmission buffer A at once when the large number of ACK packets have been burst-received in the communication terminal as illustrated in FIG. 1C. Therefore, when transmission of the data packets to the network is delayed due to burst-generation of the large number of data packets, the overflow occurs in the layer 2 transmission buffer A.

SUMMARY

According to an aspect of the invention, an apparatus includes a layer 2 transmission buffer that stores transmission packets. The apparatus monitors a free space of the buffer. The apparatus changes a first window size that is notified from another communication device, to a second window size, based on the free space, and controls an inflow of the transmission packets to the buffer, in accordance with the second window size.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described above, especially in the wireless communication, since the communication environment is easily changed, an opportunity to transmit the data packet to the network is reduced, and the overflow easily occurs in the layer 2 transmission buffer. When the overflow occurs in the layer 2 transmission buffer, the throughput is reduced. For example, in the Linux (registered trademark), the overflow of the layer 2 transmission buffer is considered as internal convergence of the communication device, and convergence control is performed, resulting in reduction of the throughput.

The technology discussed herein is made in the light of the above-described problems, and an object of the technology is to provide a communication device and a packet control method by which a reduction in a throughput is avoided.

Embodiments that are related to a communication device and a packet control method discussed herein are described below in detail with reference to drawings. The communication device and the packet control method discussed herein are not limited to the embodiments. In addition, the same symbol is assigned to configurations having a similar function in the embodiment, and the same symbol is assigned to steps in which similar processing is executed in the embodiments, and the redundant description is omitted herein.

In addition, it is assumed that a protocol used herein is a TCP.

First Embodiment

Configuration of Communication System

Figure 2:
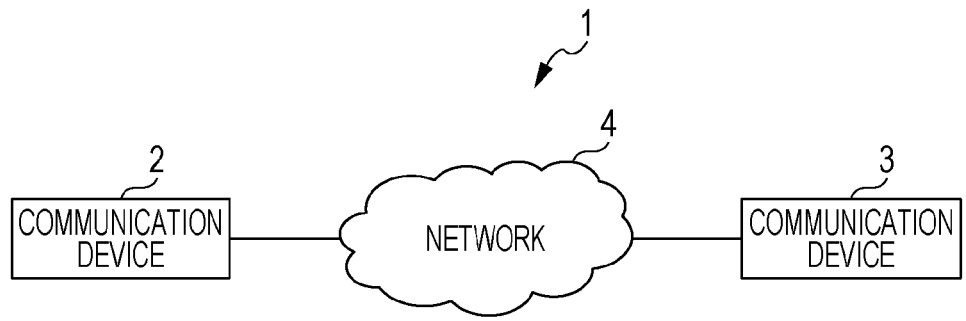
FIG. 2 is a diagram illustrating an example of a configuration of a communication system, according to an embodiment.

FIG. 2 is a diagram illustrating an example of a configuration of a communication system, according to an embodiment. In FIG. 2, a communication system 1 includes communication devices 2 and 3, and a network 4. For example, the communication device 2 is a communication terminal, the communication device 3 is a base station, and the network 4 is a wireless network.

The communication device 2 transmits a data packet to the communication device 3, and the communication device 3 transmits an ACK packet to the communication device 2. In addition, the communication device 3 notifies the communication device 2 of a window size that is determined based on a free space of a reception buffer of the communication device 3.

In transmission of a data packet, the communication device 2 retains data packets in a layer 2 transmission buffer once and thereafter transmits the data packets to the network 4. The communication device 2 generates a new data packet each time an ACK packet is received from the communication device 3. Here, the communication device 2 changes the window size that has been notified from the communication device 3, based on a free space of the layer 2 transmission buffer. In addition, the communication device 2 generates a new data packet using the window size after change, as an upper limit.

<Configuration of Communication Device>

Figure 3:
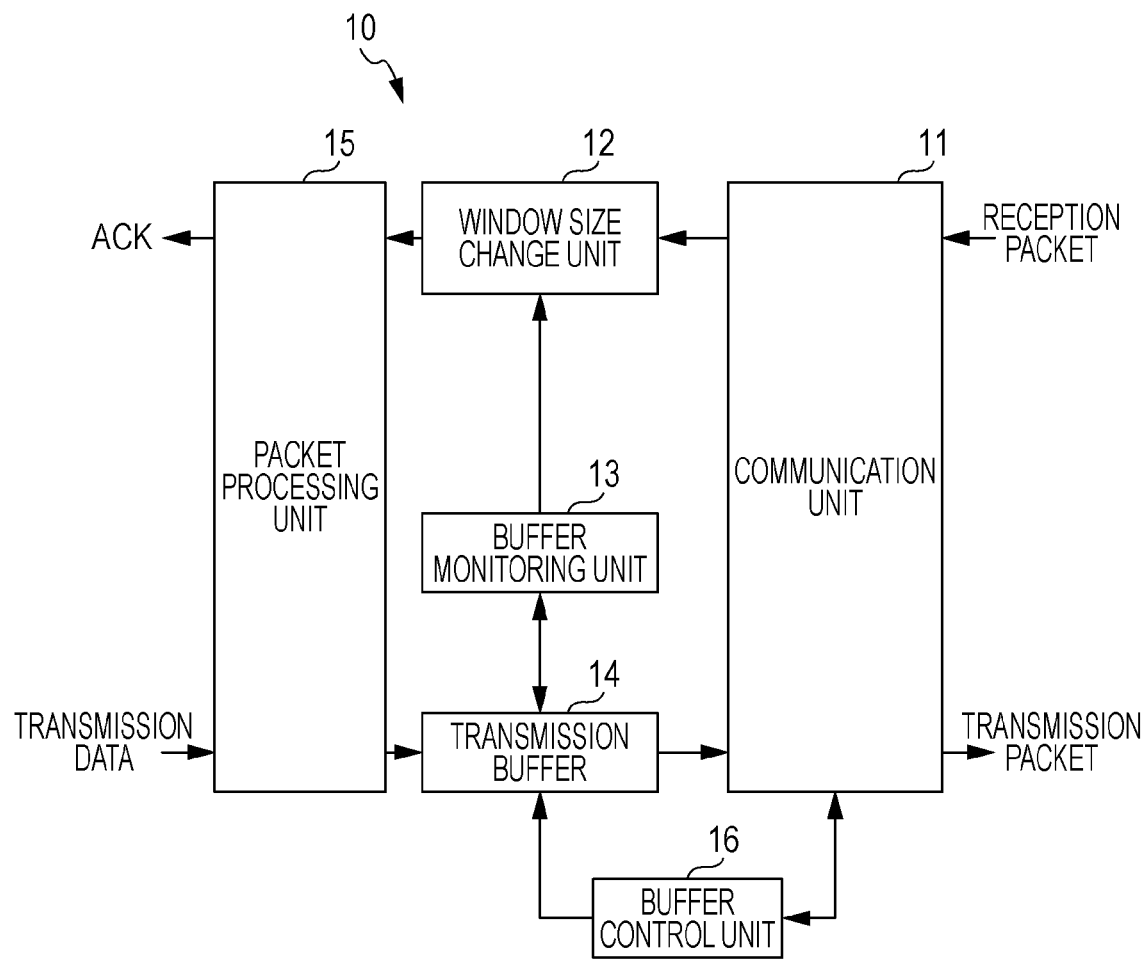
FIG. 3 is a diagram illustrating an example of a functional configuration of a communication device, according to a first embodiment.

FIG. 3 is a diagram illustrating an example of a functional configuration of a communication device, according to a first embodiment. A communication device 10 illustrated in FIG. 3 corresponds to the communication device 2 illustrated in FIG. 2. The communication device 10 includes a communication unit 11, a window size change unit 12, a buffer monitoring unit 13, a layer 2 transmission buffer 14 (hereinafter abbreviated as "transmission buffer 14" in drawings), a packet processing unit 15, and a buffer control unit 16.

Figure 4:
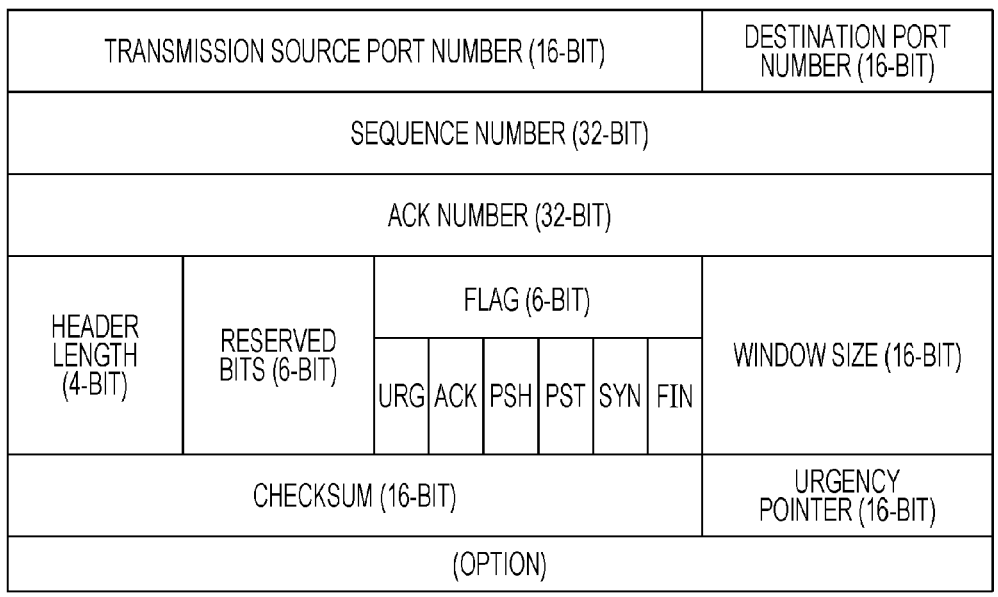
FIG. 4 is a diagram illustrating an example of a format of a TCP header, according to an embodiment.

The communication unit 11 transmits a transmission packet to the communication device 3 through the network 4, and receives a reception packet from the communication device 3. The transmission packet includes a data packet, and the reception packet includes an ACK packet. The communication unit 11 outputs the received ACK packet to the window size change unit 12. A window size that has been determined by the communication device 3 is notified by the ACK packet that includes the window size and has been transmitted from the communication device 3 to the communication device 10. FIG. 4 is a diagram illustrating an example of a format of a TCP header, according to an embodiment. In the TCP header of the ACK packet, "ACK flag" is turned on, and the window size that has been determined by the communication device 3 is included in a "window size" field.

The window size change unit 12 rewrites the window size that has been notified from the communication device 3 using the ACK packet, that is, a value of the window size field of the TCP header of the ACK packet, based on the free space of the layer 2 transmission buffer 14. That is, the window size change unit 12 changes a first window size that has been notified from the communication device 3 to a second window size, based on the free space of the layer 2 transmission buffer 14. For example, the window size change unit 12 rewrites the value of the window size field to the free space of the layer 2 transmission buffer 14.

For example, in a case where the free space of the layer 2 transmission buffer 14 is 2048 bytes when the value of the window size field is 65535 bytes, the window size change unit 12 rewrites the value of the window size field from the 65535 bytes to the 2048 bytes. In addition, the window size change unit 12 outputs the ACK packet in which the value of the window size field is set at 2048 bytes, to the packet processing unit 15. The window size change unit 12 recalculates a "checksum" field and rewrites the value of the field to an appropriate value, in accordance with the rewriting of the value of the window size field of the ACK packet.

The buffer monitoring unit 13 constantly monitors the free space of the layer 2 transmission buffer 14, and outputs the monitoring result to the window size change unit 12.

The packet processing unit 15 analyzes an ACK packet, and obtains an ACK and a window size. The packet processing unit 15 generates a new transmission packet by packetizing transmission data, and outputs the generated transmission packet to the layer 2 transmission buffer 14 each time the packet processing unit 15 obtains an ACK packet. At this time, the packet processing unit 15 generates a new transmission packet using the window size that has been changed in the window size change unit 12 as an upper limit. For example, the packet processing unit 15 generates a new transmission packet until a data amount of transmission packets for which an ACK is not received from the communication device 3 is matched with the window size after change, and outputs the generated transmission packet to the layer 2 transmission buffer 14. That is, the packet processing unit 15 controls an inflow of the transmission packets to the layer 2 transmission buffer 14, in accordance with the window size after change.

The layer 2 transmission buffer 14 retains the transmission packets that have been output from the packet processing unit 15, and outputs the transmission packets to the communication unit 11 in accordance with control of the buffer control unit 16.

The buffer control unit 16 monitors the transmission state of the communication unit 11, and causes a transmission packet to be output from the layer 2 transmission buffer 14 to the communication unit 11 each time the communication unit 11 performs transmission of a transmission packet.

<Processing of Communication Device>

Figure 5:
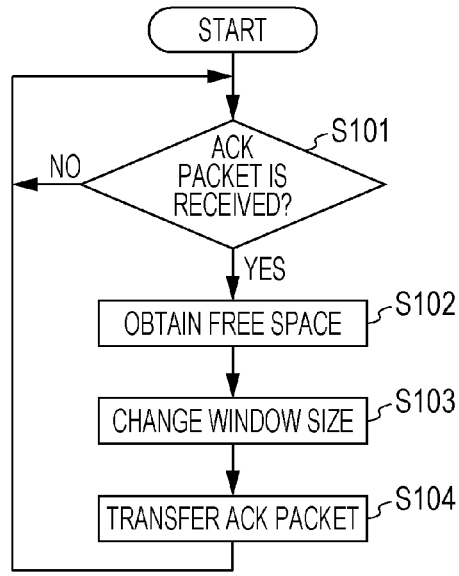
FIG. 5 is a diagram illustrating an example of an operational flowchart for processing of a communication device, according to a first embodiment.

FIG. 5 is a diagram illustrating an example of an operational flowchart for processing of a communication device, according to a first embodiment. The flowchart illustrated in FIG. 5 is started when power source of the communication device 10 is turned on, and is terminated when the power source is turned off.

The window size change unit 12 waits for reception of an ACK packet by the communication unit 11, that is, input of the ACK packet from the communication unit 11 (No in step S101).

When the communication unit 11 receives the ACK packet, and the ACK packet is input from the communication unit 11 (Yes in step S101), the window size change unit 12 obtains a free space of the layer 2 transmission buffer 14 from the buffer monitoring unit 13 (step S102).

After that, the window size change unit 12 changes a window size that has been notified from the communication device 3, to a free space of the layer 2 transmission buffer 14, that is, rewrites a value of the window field of the ACK packet to a value of the free space of the layer 2 transmission buffer 14 (step S103).

After that, the window size change unit 12 transfers the ACK packet the window size of which has been changed, to the packet processing unit 15 (step S104). After the processing of step S104, the flow returns to step S101.

As described above, in the embodiment, the communication device 10 includes the layer 2 transmission buffer 14, the buffer monitoring unit 13, the window size change unit 12, and the packet processing unit 15. The layer 2 transmission buffer 14 retains transmission packets. The buffer monitoring unit 13 monitors the free space of the layer 2 transmission buffer 14. The window size change unit 12 changes a first window size that has been notified from the communication device 3 to a second window size based on the free space of the layer 2 transmission buffer 14. The packet processing unit 15 controls an inflow of the transmission packets to the layer 2 transmission buffer 14, in accordance with the changed second window size.

Therefore, the window size is controlled based on the free space of the layer 2 transmission buffer 14, and the inflow of the transmission packets to the layer 2 transmission buffer 14 is controlled in accordance with the changed window size, so that occurrence of overflow in the layer 2 transmission buffer 14 may be avoided. Thus, a reduction in a throughput, which is attributed to the overflow of the layer 2 transmission buffer 14, may be avoided.

In addition, the window size change unit 12 regards the free space of the layer 2 transmission buffer 14 as the changed second window size.

As described above, the free space of the layer 2 transmission buffer 14 is used as the window size as is, so that overflow of the layer 2 transmission buffer 14 may be avoided beforehand by relatively simple control.

Second Embodiment

Configuration of Communication Device

Figure 6:
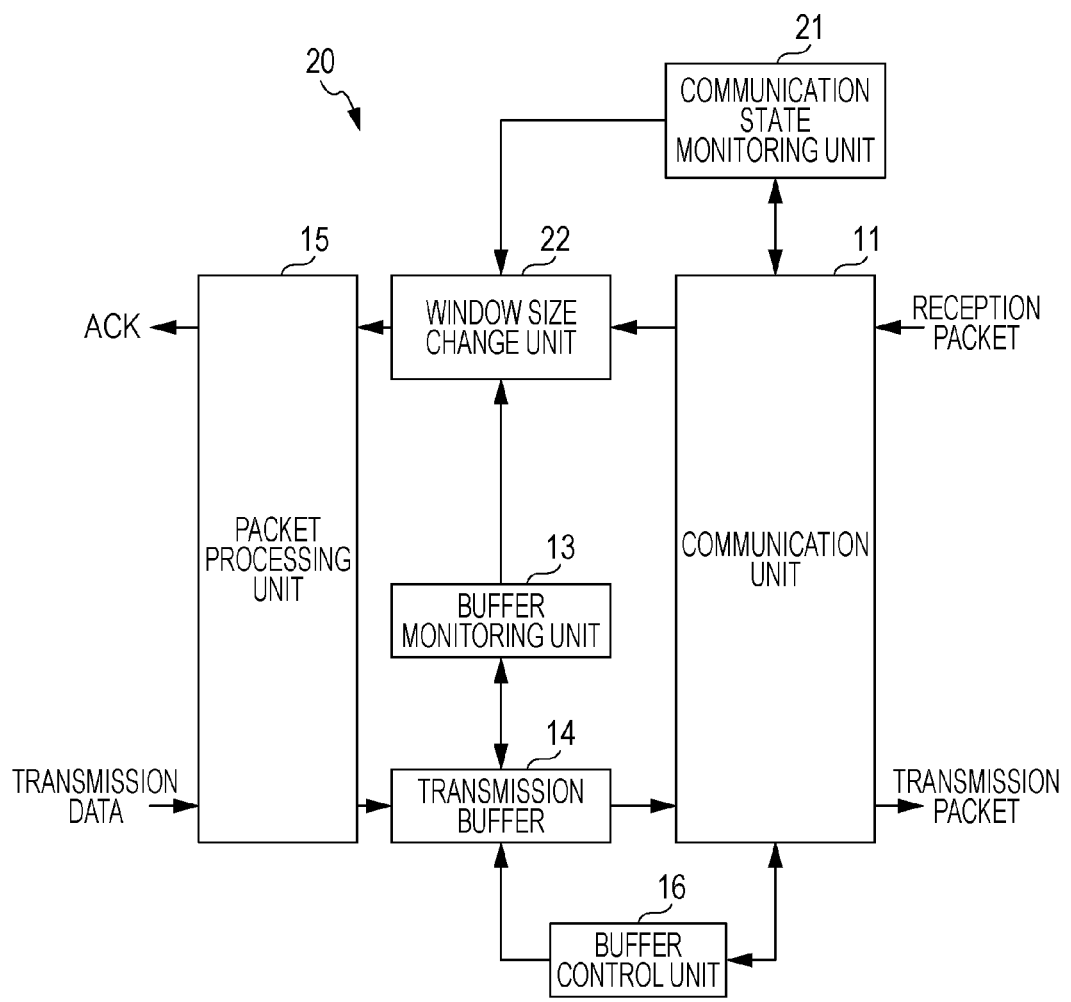
FIG. 6 is a diagram illustrating an example of a functional configuration of a communication device, according to a second embodiment.

FIG. 6 is a diagram illustrating an example of a functional configuration of a communication device, according to a second embodiment. A communication device 20 illustrated in FIG. 6 corresponds to the communication device 2 illustrated in FIG. 2. The communication device 20 includes a communication state monitoring unit 21 and a window size change unit 22.

The communication state monitoring unit 21 monitors communication with the communication device 3, which is performed by the communication unit 11, and detects cut-off of the communication and recovery of the communication from the cut-off. For example, the communication state monitoring unit 21 determines that the communication is cut off when the communication unit 11 does not receive a response for a message that has been transmitted to the communication device 3 by the communication unit 11 within a certain time. In addition, the communication state monitoring unit 21 determines that the communication is recovered from the cut-off when the communication unit 11 receives the response from the communication device 3 in the state in which the communication is cut off. The communication state monitoring unit 21 outputs the detection result to the window size change unit 22.

Figure 1A:
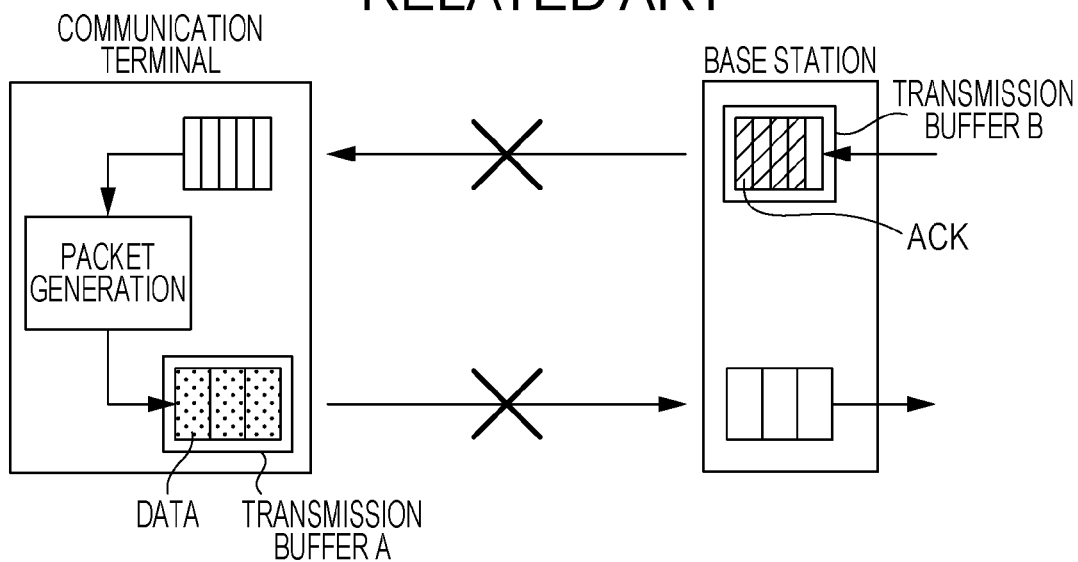
FIG. 1A is a diagram illustrating a problem of a communication system in a related art.
Figure 1B:
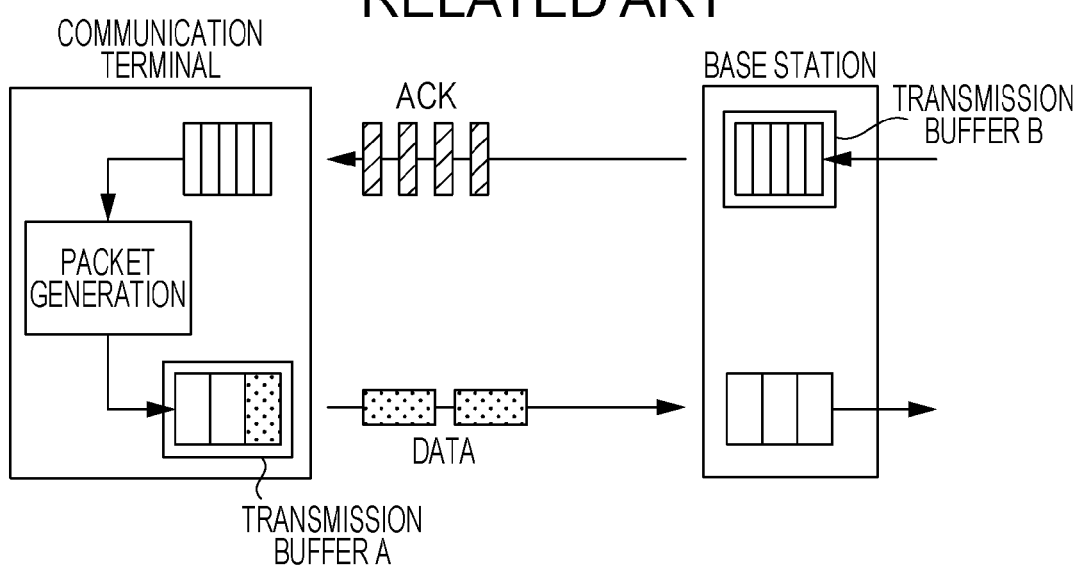
FIG. 1B is a diagram illustrating a problem of the communication system in a related art.
Figure 1C:
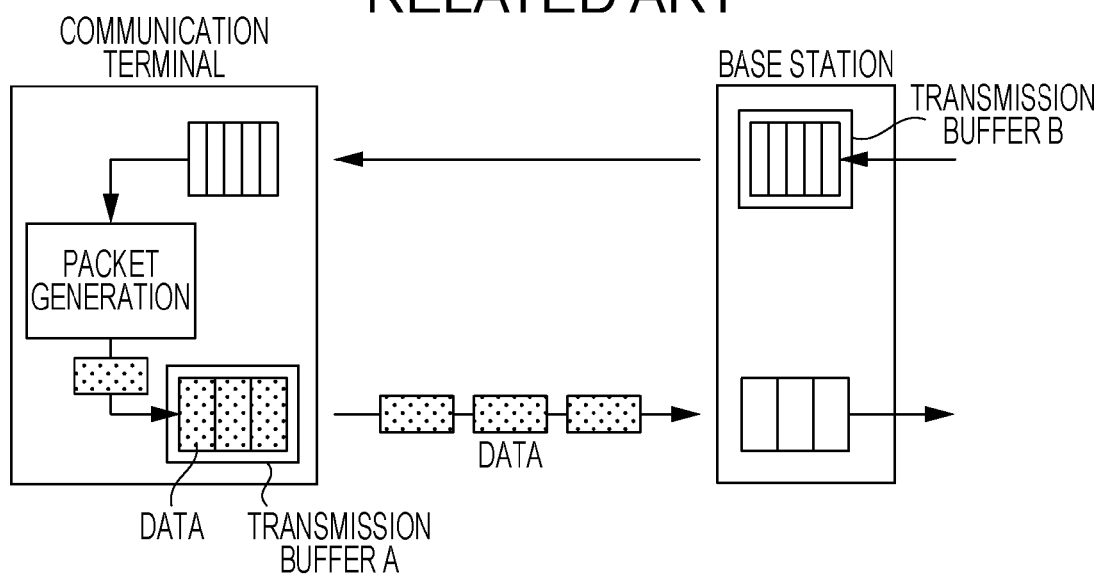
FIG. 1C is a diagram illustrating a problem of the communication system in a related art.

The window size change unit 22 executes the following processing in addition to the processing that is executed by the window size change unit 12 according to the first embodiment. That is, when the detection result that indicates that the communication with the communication device 3 has been recovered from cut-off is input from the communication state monitoring unit 21, the window size change unit 22 executes processing that is similar to the window size change unit 12 according to the first embodiment. Here, when restoration of the communication with the communication device 3 is detected, the window size change unit 22 changes a window size that has been notified from the communication device 3. This is why it is probable that overflow of the layer 2 transmission buffer 14 occurs when the communication is recovered from the cut-off, as illustrated in FIGS. 1A to 1C.

<Processing of Communication Device>

Figure 7:
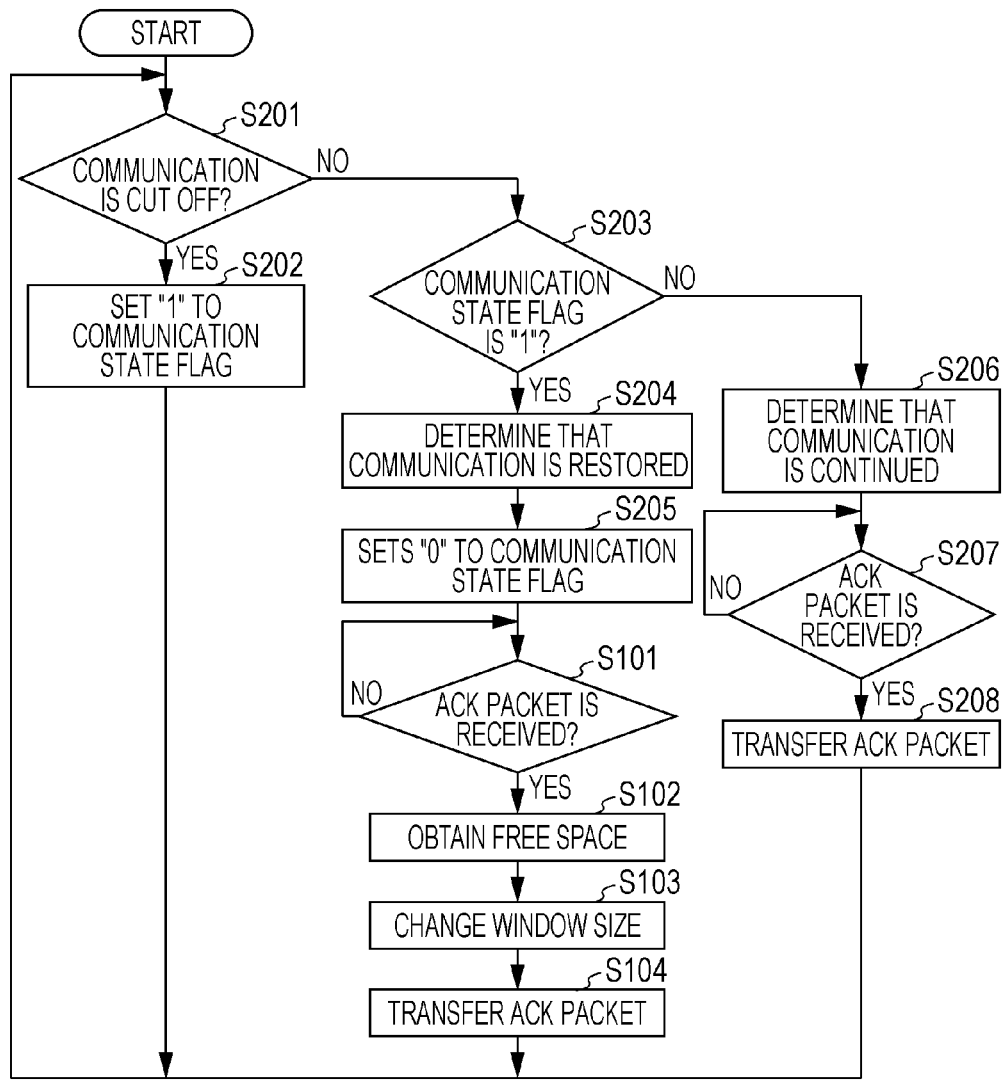
FIG. 7 is a diagram illustrating an example of an operational flowchart of a communication device, according to a second embodiment.

FIG. 7 is a diagram illustrating an example of an operational flowchart of a communication device, according to a second embodiment. The flowchart illustrated in FIG. 7 is started when power source of the communication device 20 is turned on, and is terminated when the power source is turned off. When the flowchart in FIG. 7 is started, a communication state flag is set at an initial value of "0".

The communication state monitoring unit 21 monitors communication with the communication device 3, which is performed by the communication unit 11, and determines whether or not the communication is cut off (step S201). When the communication state monitoring unit 2 determines that the communication is cut off, that is, detects cut-off of the communication (Yes in step S201), the communication state monitoring unit 21 outputs the detection result to the window size change unit 22, and sets "1" to the communication state flag (step S202). After the processing of step S202, the flow returns to step S201.

On the other hand, when the communication state monitoring unit 21 determines that the communication is not cut off (No in step S201), the communication state monitoring unit 21 determines whether or not the communication state flag is "1" (step S203). In a case in which the communication state flag is "1" even when the communication is not cut off, it is indicated that the communication is recovered from the cut-off state. Therefore, when the communication state flag is "1" (Yes in step S203), the communication state monitoring unit 21 determines that the communication has been recovered, that is, detects recovery of the communication, and outputs the detection result to the window size change unit 22 (step S204). In addition, the communication state monitoring unit 21 sets "0" to the communication state flag (step S205). After the processing of the step S205, similar to the first embodiment, the processing of steps S101 to S104 is executed by the window size change unit 22. After the processing of step S104, the flow returns to step S201.

In step S203, when the communication state flag is "0" (No in step S203), the communication state monitoring unit 21 determines that the communication is being continued, and outputs the determination result to the window size change unit 22 (step S206). The window size change unit 22 waits for reception of an ACK packet by the communication unit 11, that is, waits for an input of an ACK packet from the communication unit 11 (No in step S207) during the communication. When the communication unit 11 receives an ACK packet, and the ACK packet is input to the window size change unit 22 from the communication unit 11 (Yes in step S207), the window size change unit 22 transfers the input ACK packet to the packet processing unit 15 as is (step S208).

As described above, in the embodiment, the communication state monitoring unit 21 monitors the state of communication with the communication device 3, and detects cut-off of the communication and recovery of the communication from the cut-off. When recovery of the communication is detected, the window size change unit 22 changes a first window size that has been notified from the communication device 3 to a second window size.

Therefore, when it is highly probable that overflow of the layer 2 transmission buffer 14 occurs, the window size may be changed to avoid the overflow of the layer 2 transmission buffer 14.

Third Embodiment

Configuration of Communication Device

Figure 8:
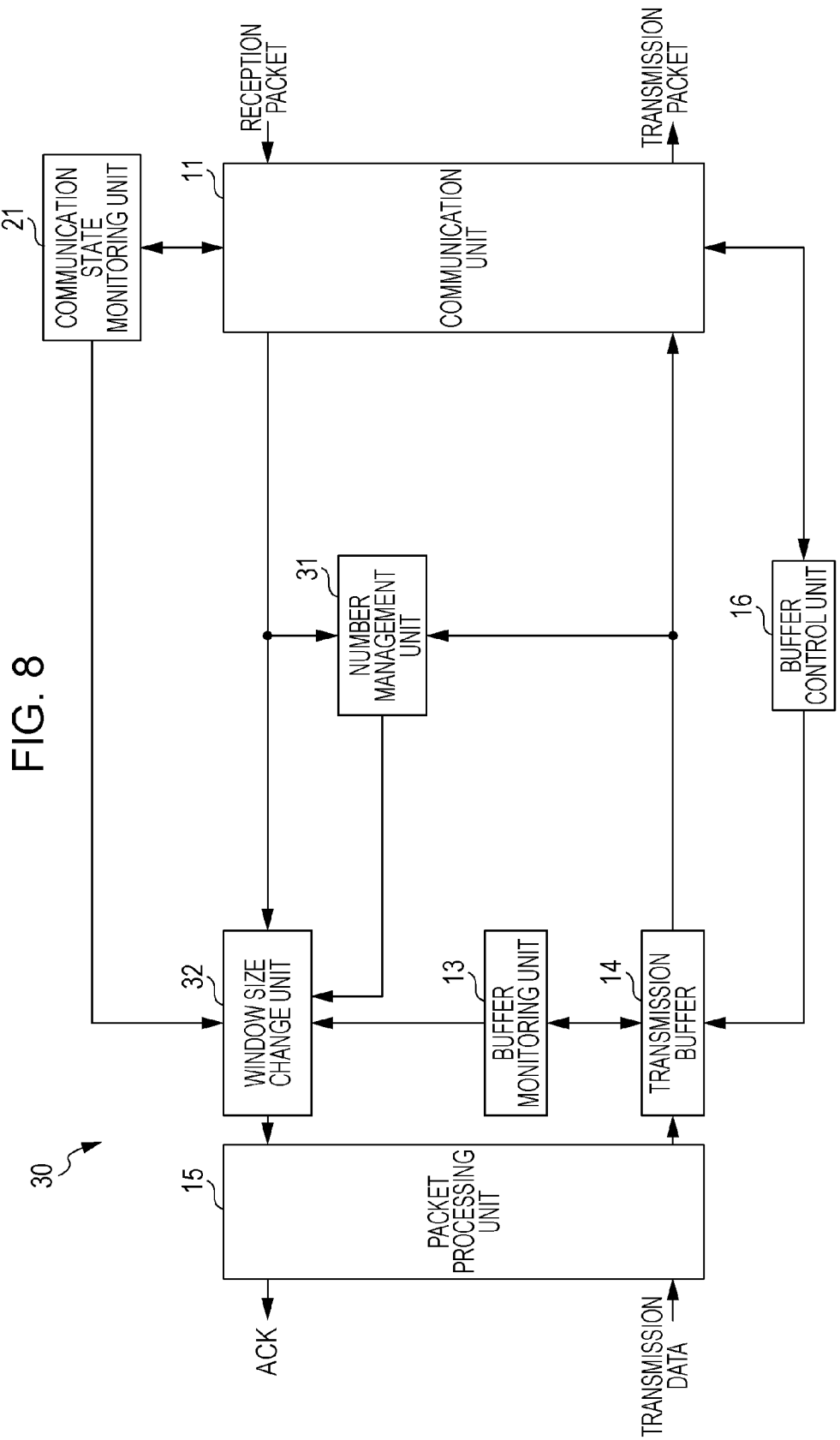
FIG. 8 is a diagram illustrating an example of a functional configuration of a communication device, according to a third embodiment.

FIG. 8 is a diagram illustrating an example of a functional configuration of a communication device, according to a third embodiment. A communication device 30 illustrated in FIG. 8 corresponds to the communication device 2 illustrated in FIG. 2. The communication device 30 includes a number management unit 31 and a window size change unit 32.

To the number management unit 31, a transmission packet that has been output from the layer 2 transmission buffer 14 is input. In addition, to the number management unit 31, an ACK packet that has been output from the communication unit 11 is input. The number management unit 31 obtains a sequence number of the transmission packet (FIG. 4), from the transmission packet and manages the sequence number. In addition, the number management unit 31 obtains an ACK number of the ACK packet (FIG. 4), from the ACK packet, and manages the ACK number. The number management unit 31 manages only the latest sequence number and the latest ACK number.

Here, in the TCP, as the sequence number of the transmission packet, a data amount [byte] that is transmitted from the communication device 30 (hereinafter may be simply referred to as "transmitted data amount") after connection of the TCP between the communication device 30 and the communication device 3 has been established may be used. In addition, in the TCP, as the ACK number of the ACK packet, a data amount [byte] that is received by the communication device 3 (hereinafter may be simply referred to as "received data amount") after the connection of the TCP between the communication device 30 and the communication device 3 has been established may be used. The transmitted data amount and the received data amount are cumulative values after the connection of the TCP between the communication device 30 and the communication device 3 has been established.

The window size change unit 32 executes the following processing in addition to the processing that is executed by the window size change unit 22 according to the second embodiment. That is, the window size change unit 32 obtains a sequence number and an ACK number that are managed by the number management unit 31, from the number management unit 31 when a detection result that indicates that communication with the communication device 3 is cut off is input from the communication state monitoring unit 21. Since the number management unit 31 manages only the latest sequence number and the latest ACK number, the sequence number and the ACK number that are obtained by the window size change unit 32 at that time are the most recent transmitted data amount before cut-off of the communication, and the most recent received data amount before the cut-off of the communication, respectively.

In addition, when a detection result that indicates that the communication with the communication device 3 is recovered form cut-off is input from the communication state monitoring unit 21, the window size change unit 32 calculates the window size after change, in accordance with the following formula (1). In the formula (1), "sequence number−ACK number" corresponds to a data amount of packets that flow through the network 4 in a direction from the communication device 30 to the communication device 3, that is, a data amount that has been transmitted from the communication device 30, but does not reach the communication device 3.

The window size=free space of the layer 2 transmission buffer 14+(sequence number−ACK number)       (1)

For example, when the window size that has been notified from the communication device 3 is 65535 bytes, the free space of the layer 2 transmission buffer 14 is 2048 bytes, the sequence number is 1150, and the ACK number is 1100, the window size change unit 32 changes the window size from the 65535 bytes to the 2098 bytes.

<Processing of Communication Device>

Figure 9:
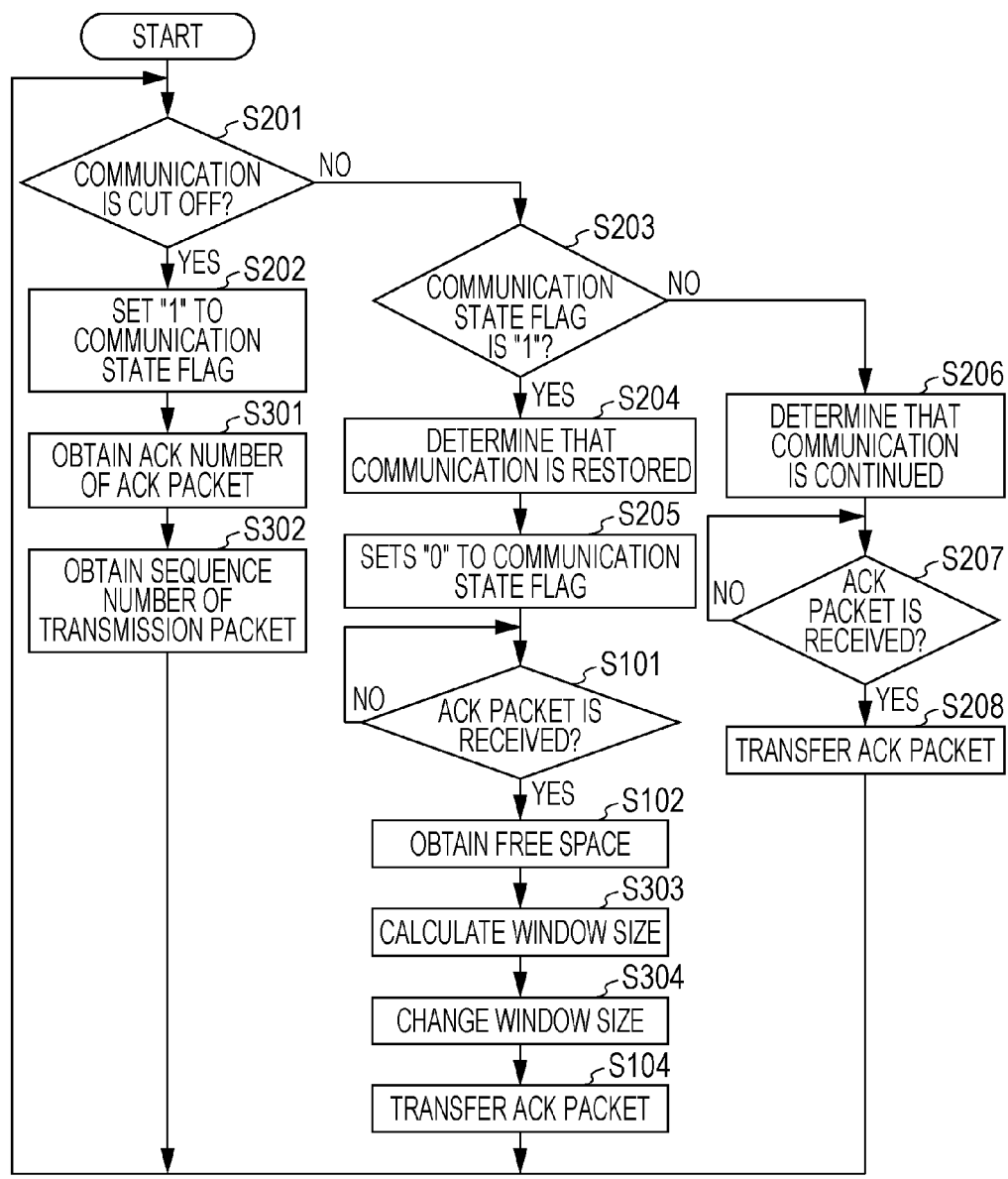
FIG. 9 is a diagram illustrating an example of an operational flowchart for processing of a communication device, according to a third embodiment.

FIG. 9 is a diagram illustrating an example of an operational flowchart for processing of a communication device, according to a third embodiment. The flowchart illustrated in FIG. 9 is started when power source of the communication device 30 is turned on, and is terminated when the power source is turned off. When the flowchart of FIG. 9 is started, the communication state flag is set at an initial value of "0".

When the communication state monitoring unit 21 determines that the communication is cut off, that is, detects the cut-off of the communication (Yes in step S201), the communication state monitoring unit 21 outputs the detection result to the window size change unit 32, and sets "1" to the communication state flag (step S202).

When the communication state monitoring unit 21 detects cut-off of the communication (Yes in step S201), the window size change unit 32 obtains an ACK number of an ACK packet and a sequence number of a transmission packet from the number management unit 31 (steps S301 and S302). After the processing of step S302, the flow returns to step S201.

After the processing of the communication state monitoring unit 21 in step S205, when an ACK packet is input from the communication unit 11 (Yes in step S101), the window size change unit 32 obtains a free space of the layer 2 transmission buffer 14 from the buffer monitoring unit 13 (step S102).

After that, the window size change unit 32 calculates the window size after change in accordance with the formula (1) (step S303).

In addition, the window size change unit 32 changes the window size that has been notified from the communication device 3, to the window size that has been calculated in step S303. That is, the window size change unit 32 changes the value of the window field of the ACK packet, to the value that has been calculated in step S303 (step S304). After the processing of step S304, the flow proceeds to step S104.

As described above, in the embodiment, the window size change unit 32 calculates the window size after change, based on the free space of the layer 2 transmission buffer 14, the most recent transmitted data amount from the communication device 30 before cut-off of the communication with the communication device 3, and the most recent received data amount in the communication device 3 before cut-off of the communication with the communication device 3.

Therefore, since the window size after change is calculated by considering an amount of data that has been transmitted from the communication device 30 but does not reach the communication device 3, a value just before overflow of the layer 2 transmission buffer 14 occurs may be set as the window size. Thus, utilization efficiency of the layer 2 transmission buffer 14 and utilization efficiency of a communication band of the network 4 may be improved.

Fourth Embodiment

Configuration of Communication Device

Figure 10:
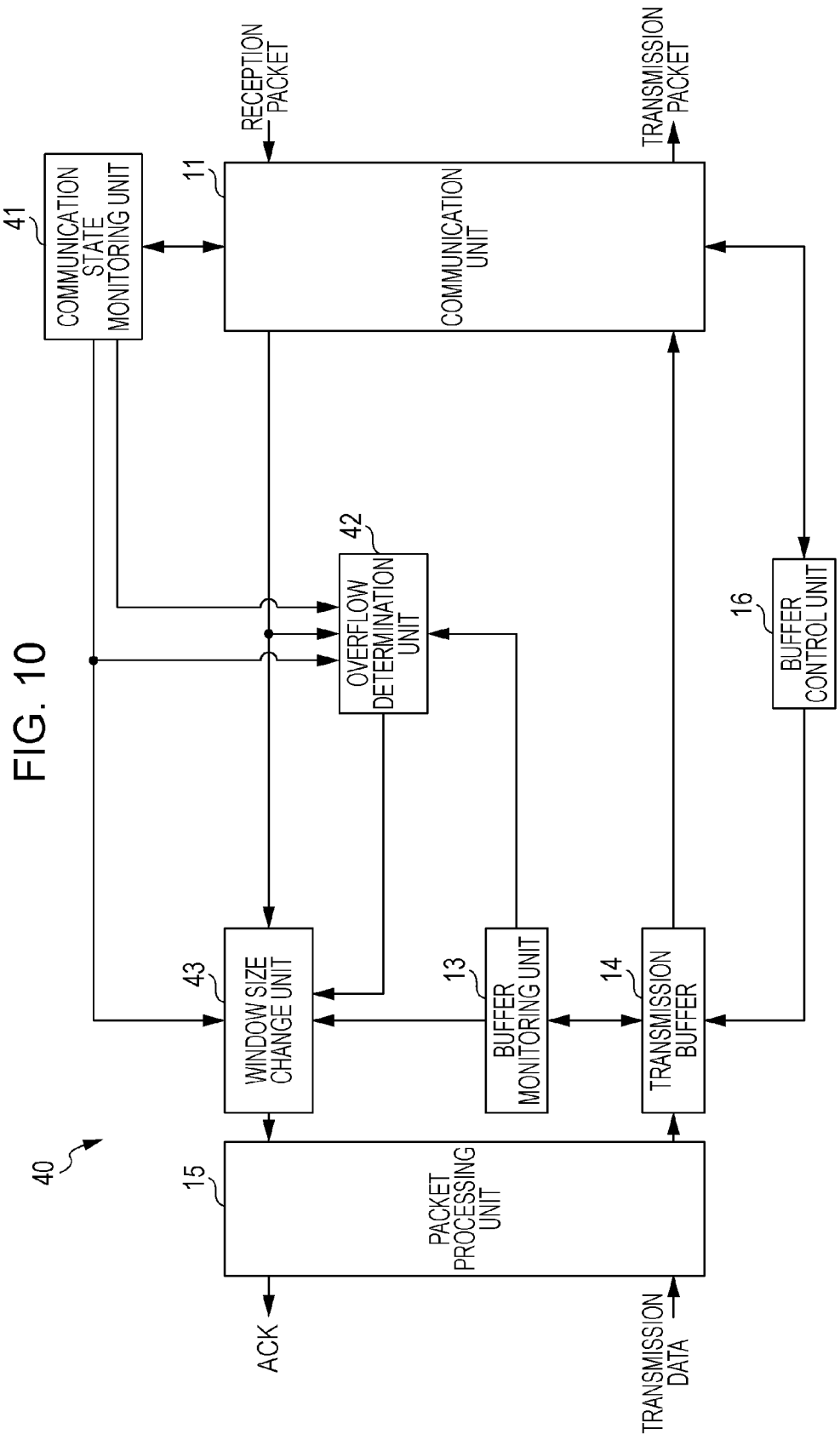
FIG. 10 is a diagram illustrating an example of a functional configuration of a communication device, according to a fourth embodiment.

FIG. 10 is a diagram illustrating an example of a functional configuration of a communication device, according to a fourth embodiment. A communication device 40 illustrated in FIG. 10 corresponds to the communication device 2 illustrated in FIG. 2. The communication device 40 includes a communication state monitoring unit 41, an overflow determination unit 42, and a window size change unit 43.

The communication state monitoring unit 41 executes the following processing in addition to the processing that is executed by the communication state monitoring unit 21 according to the second embodiment. That is, the communication state monitoring unit 41 monitors communication with the communication device 3, which is performed by the communication unit 11, and measures the transmission rate of a transmission packet. In addition, the communication state monitoring unit 41 detects cut-off of the communication and recovery of the communication from the cut-off, and outputs the detection result to the overflow determination unit 42 and the window size change unit 43.

To the overflow determination unit 42, an ACK packet that has been output from the communication unit 11 is input. The overflow determination unit 42 executes the following processing when a detection result that indicates that the communication with the communication device 3 is recovered from the cut-off is input from the communication state monitoring unit 41. That is, the overflow determination unit 42 obtains the transmission rate from the communication state monitoring unit 41. In addition, the overflow determination unit 42 measures an increase amount of the ACK number during a certain monitoring time. Here, it is desirable that "certain monitoring time" is defined as a time from the timing of recovery of the communication until an input interval of ACK packets to the overflow determination unit 42 (that is, a reception interval of ACK packets in the communication device 40) becomes a transmission interval of transmission packets or more. This is why it may be determined that the ACK packets are not burst-transmitted from the communication device 3 when the reception interval of the ACK packets is the transmission interval of the transmission packet or more. In addition, the overflow determination unit 42 calculates the transmission interval of the transmission packet by dividing the packet size of the transmission packet by the transmission rate of the transmission packet. In addition, the overflow determination unit 42 calculates an increase rate of the ACK number, based on a certain monitoring time and an increase amount of the ACK number in the certain monitoring time. In addition, the overflow determination unit 42 obtains a free space of the layer 2 transmission buffer 14 from the buffer monitoring unit 13. In addition, the overflow determination unit 42 determines that overflow of the layer 2 transmission buffer 14 occurs when a condition of the formula (2) is satisfied, determines that overflow of the layer 2 transmission buffer 14 does not occur when the condition of the formula (2) is not satisfied, and outputs the determination result to the window size change unit 43.

The free space of the layer 2 transmission buffer 14 [byte]<certain monitoring time [sec]×(increase rate of the ACK number [byte/sec]−transmission rate [byte/sec])   (2)

The window size change unit 43 executes the following processing in addition to the processing that is executed by the window size change unit 22 according to the second embodiment. That is, the window size change unit 43 changes a window size that has been notified from the communication device 3 when a determination result that indicates that overflow of the layer 2 transmission buffer 14 occurs is input. On the other hand, when a determination result that indicates that overflow of the layer 2 transmission buffer 14 does not occur is input, the window size change unit 43 outputs the ACK packet that has been input from the communication unit 11 to the packet processing unit 15 as is without changing the window size that has been notified from the communication device 3.

The above-described calculation that is performed by the overflow determination unit 42 is described below using a specific example of a numerical value. For example, when the transmission rate of a transmission packet is 6.25×10$^6$ [byte/sec], and the packet size of the transmission packet is 1514 [bytes], the overflow determination unit 42 calculates 242.24×10$^{-6}$ [sec]/240 [μsec] as a transmission interval of the transmission packets by dividing the packet size of the transmission packet by the transmission rate of the transmission packet. In addition, when an increase amount of an ACK number per one ACK packet is 1514 [bytes], and a certain monitoring time is 48 [msec] (48 [msec] corresponds to a time required for transmission of 200 packets), the overflow determination unit 42 calculates "1514 [byte]× 200=302800 [byte]" as the increase amount of the ACK number in the certain monitoring time. In addition, the overflow determination unit 42 calculates "302800 [byte]/48 [msec]=6308333 [byte/sec]" as the increase rate of the ACK number.

<Processing of Communication Device>

Figure 11:
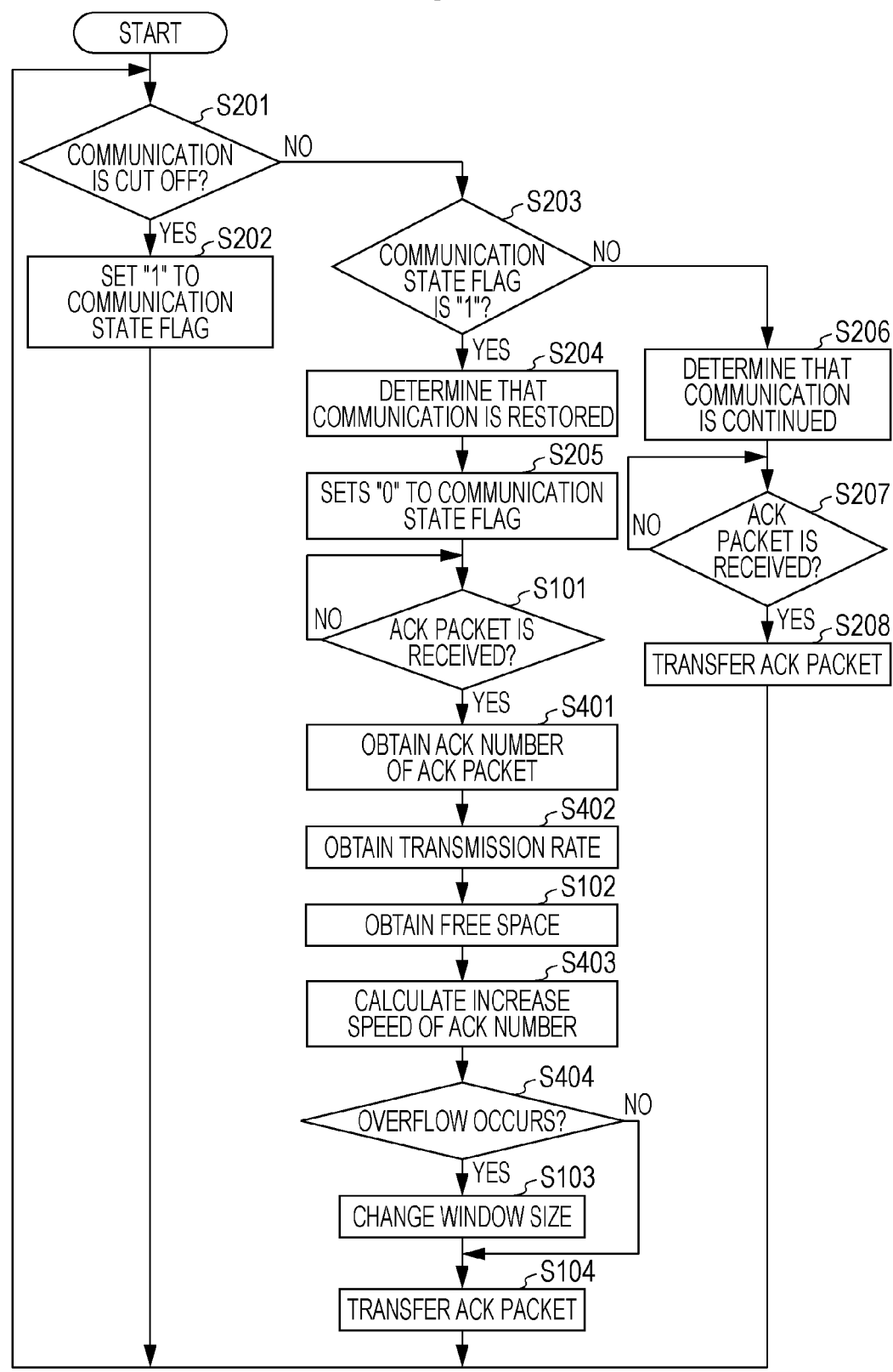
FIG. 11 is a diagram illustrating an example of an operational flowchart for processing of a communication device, according to a fourth embodiment.

FIG. 11 is a diagram illustrating an example of an operational flowchart for processing of a communication device, according to a fourth embodiment. The flowchart illustrated in FIG. 11 is started when power source of the communication device 40 is turned on, and is terminated when the power source is turned off. When the flowchart of FIG. 11 is started, the communication state flag is set at an initial value of "0".

After the processing of the communication state monitoring unit 41 in step S205, when an ACK packet is input from the communication unit 11 (Yes in step S101), the overflow determination unit 42 obtains an ACK number of the ACK packet, from the ACK packet (step S401). In addition, the overflow determination unit 42 obtains a transmission rate from the communication state monitoring unit 41 (step S402), and obtains a free space of the layer 2 transmission buffer 14 from the buffer monitoring unit 13 (step S102).

After that, the overflow determination unit 42 calculates an increase rate of the ACK number as described above (step S403).

After that, the overflow determination unit 42 determines whether or not overflow of the layer 2 transmission buffer 14 occurs (step S404). That is, the overflow determination unit 42 determines that overflow of the layer 2 transmission buffer 14 occurs when the condition that is indicated in the formula (2) is satisfied, and determines that overflow of the layer 2 transmission buffer 14 does not occur the condition that is indicated in the formula (2) is not satisfied.

When the overflow determination unit 42 determines that overflow of the layer 2 transmission buffer 14 occurs (Yes in step S404), the window size change unit 43 changes a window size that has been notified from the communication device 3, to the free space of the layer 2 transmission buffer 14 (step S103). In addition, the window size change unit 43 transfers the ACK packet after the window size has been changed, to the packet processing unit 15 (step S104).

On the other hand, the overflow determination unit 42 determines that overflow of the layer 2 transmission buffer 14 does not occur (No in step S404), the window size change unit 43 transfers the ACK packet that has been input from the communication unit 11, to the packet processing unit 15 as is (step S104).

After the processing of step S104, the flow returns to step S201.

As described above, in the embodiment, the overflow determination unit 42 determines whether or not overflow of the layer 2 transmission buffer 14 occurs. The window size change unit 43 changes the window size when the overflow determination unit 42 determines that overflow of the layer 2 transmission buffer 14 occurs.

Therefore, when it is not probable that overflow of the layer 2 transmission buffer 14 occurs, the window size is not changed, so that unnecessary change of the window size may be omitted. Therefore, change frequency of the window size may be reduced in a state where overflow of the layer 2 transmission buffer 14 is avoided. Thus, a processing load of the communication device 40 may be reduced.

In addition, the overflow determination unit 42 determines whether or not overflow of the layer 2 transmission buffer 14 occurs, based on a free space of the layer 2 transmission buffer 14, the transmission rate of a transmission packet, the increase rate of an ACK number that has been received by the communication unit 11.

Therefore, whether or not overflow of the layer 2 transmission buffer 14 occurs may be determined accurately.

Fifth Embodiment

Configuration of Communication Device

Figure 12:
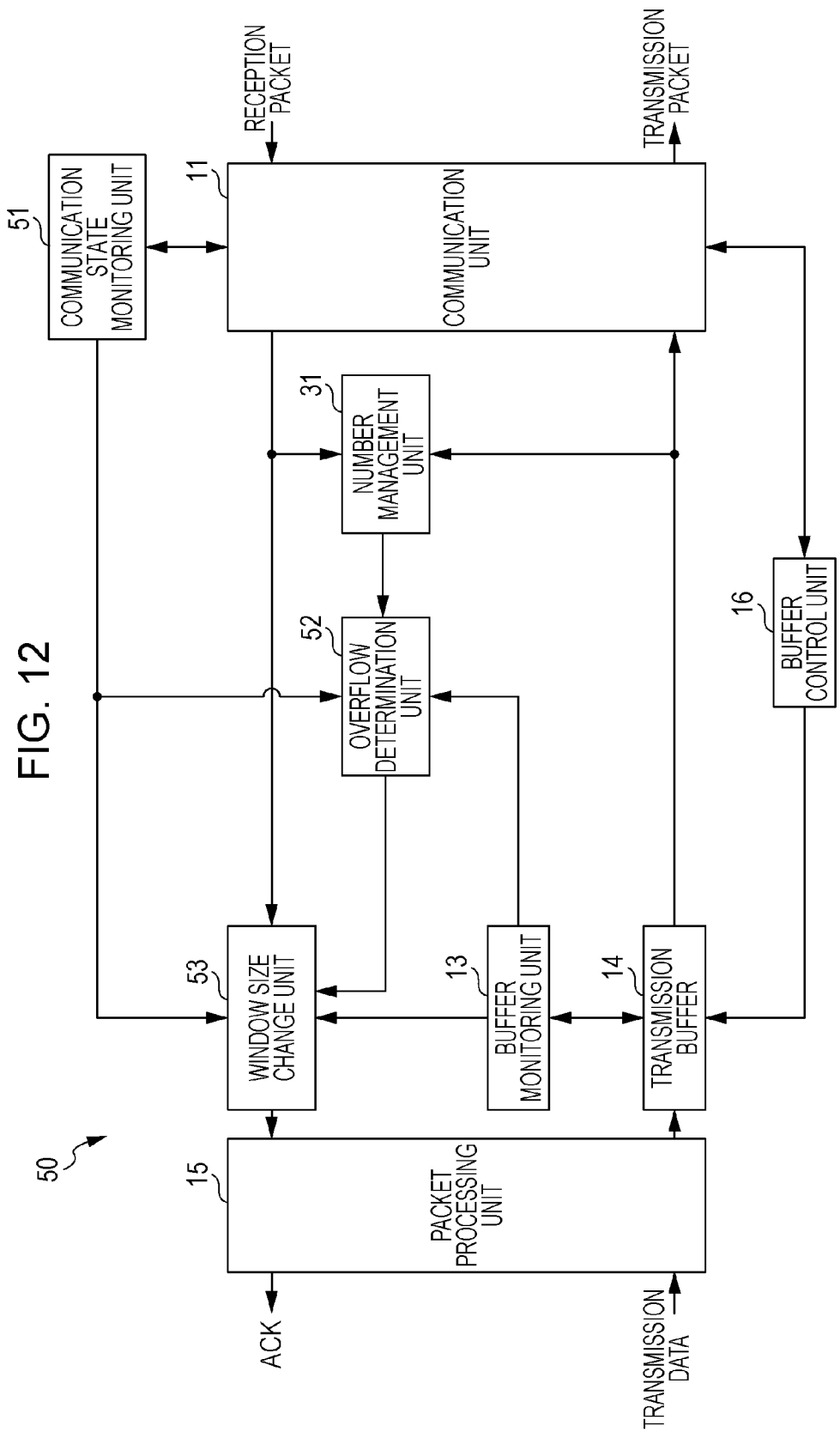
FIG. 12 is a diagram illustrating an example of a functional configuration of a communication device, according to a fifth embodiment.

FIG. 12 is a diagram illustrating an example of a functional configuration of a communication device, according to a fifth embodiment. A communication device 50 illustrated in FIG. 12 corresponds to the communication device 2 illustrated in FIG. 2. The communication device 50 includes a communication state monitoring unit 51, an overflow determination unit 52, and a window size change unit 53.

The communication state monitoring unit 51 executes the following processing in addition to the processing that is executed by the communication state monitoring unit 21 according to the second embodiment. That is, the communication state monitoring unit 51 detects cut-off of the communication and recovery of the communication from the cut-off, and outputs the detection result to the overflow determination unit 52 and the window size change unit 53.

When a detection result that indicates that the communication with the communication device 3 is cut off is input from the communication state monitoring unit 51, the overflow determination unit 52 obtains a sequence number and an ACK number that are managed by the number management unit 31 from the number management unit 31. Since the number management unit 31 manages only the latest sequence number and the latest ACK number, the sequence number and the ACK number that are obtained by the overflow determination unit 52 at this time indicate the most recent transmitted data amount before cut-off of the communication and the most recent received data amount before the cut-off of the communication. In addition, at this time, the overflow determination unit 52 obtains the free space of the layer 2 transmission buffer 14 from the buffer monitoring unit 13. In addition, at the time of cut-off of the communication, the overflow determination unit 52 determines that overflow of the layer 2 transmission buffer 14 occurs when the condition of the formula (3) is satisfied, and determines that overflow of the layer 2 transmission buffer 14 does not occur when the condition of the formula (3) is not satisfied. In addition, when the overflow determination unit 52 determines that overflow of the layer 2 transmission buffer 14 occurs, the overflow determination unit 52 sets an overflow flag at "1", and then outputs the set overflow flag to the window size change unit 53. The overflow flag indicates one of states corresponds to "0" or "1".

The free space of the layer 2 transmission buffer 14 [byte]<sequence number [byte]–ACK number [byte] (3)

The window size change unit 53 executes the following processing in addition to the processing that is executed by the window size change unit 22 according to the second embodiment. That is, when a detection result that indicates that communication with the communication device 3 is recovered from cut-off is input from the communication state monitoring unit 51, the window size change unit 53 checks the state of the overflow flag, which has been input from the overflow determination unit 52 at the time of cut-off of the communication. In addition, when the overflow flag is "1", the window size change unit 53 changes the window size that has been notified from the communication device 3. On the other hand, when the overflow flag is "0", the window size change unit 53 outputs the ACK packet that has been input from the communication unit 11 to the packet processing unit 15 as is without changing the window size that has been notified from the communication device 3.

<Processing of Communication Device>

Figure 13:
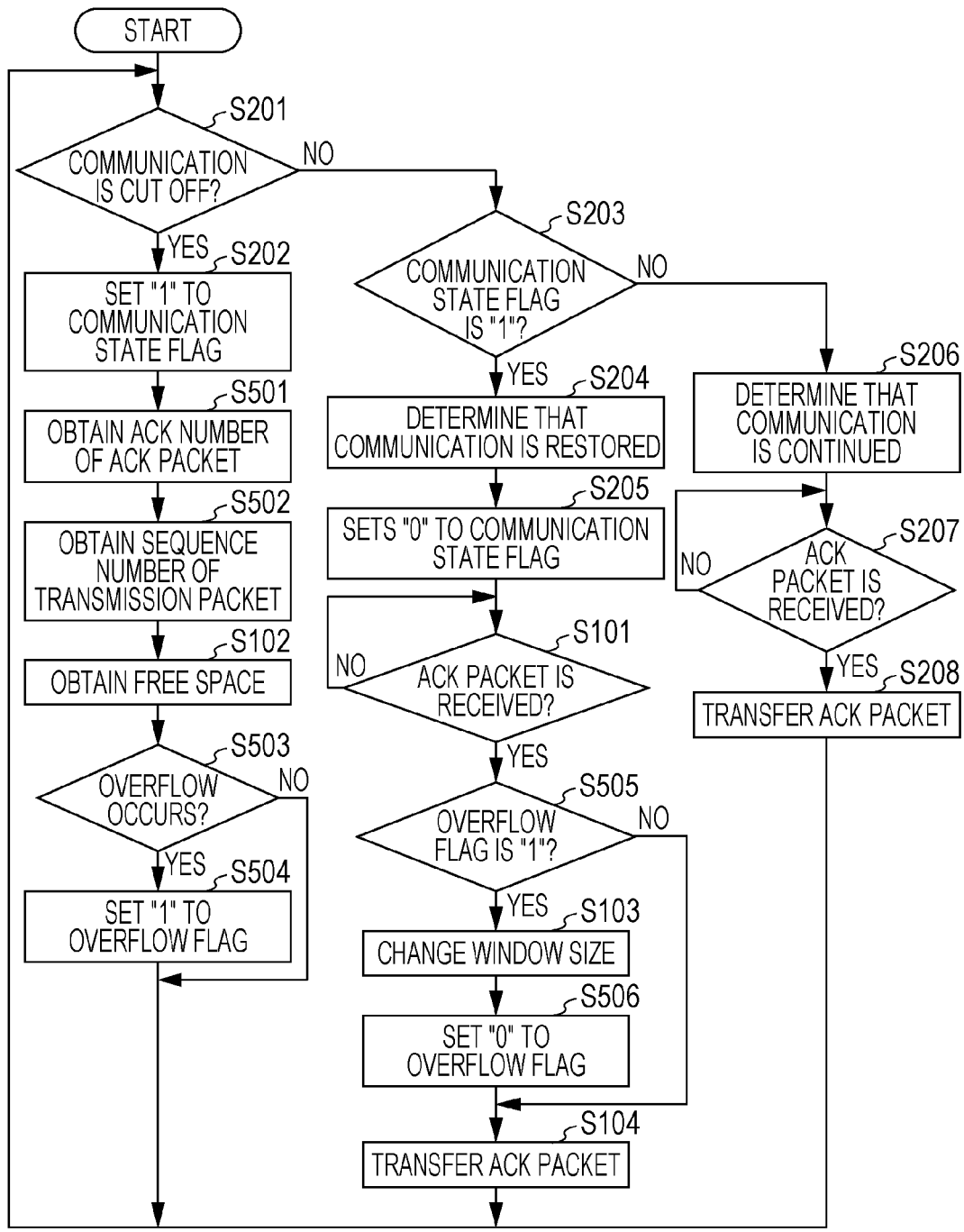
FIG. 13 is a diagram illustrating an example of an operational flowchart for processing of a communication device, according to a fifth embodiment.

FIG. 13 is a diagram illustrating an example of an operational flowchart for processing of a communication device, according to a fifth embodiment. The flowchart illustrated in FIG. 13 is started when power source of the communication device 50 is turned on, and is terminated when the power source is turned off. When the flowchart of FIG. 13 is started, the communication state flag and the overflow flag are set at an initial value of "0".

When the communication state monitoring unit 51 detects cut-off of the communication (Yes in step S201), the overflow determination unit 52 obtains an ACK number of an ACK packet and a sequence number of a transmission packet from the number management unit 31 (steps S501 and S502). In addition, the overflow determination unit 52 obtains a free space of the layer 2 transmission buffer 14 from the buffer monitoring unit 13 (step S102).

After that, the overflow determination unit 52 determines whether or not overflow of the layer 2 transmission buffer 14 occurs (step S503). That is, the overflow determination unit 52 determines that overflow of the layer 2 transmission buffer 14 occurs when the condition that is indicated in the formula (3) is satisfied, and determines that overflow of the layer 2 transmission buffer 14 does not occur when the condition that is indicated in the formula (3) is not satisfied.

When the overflow determination unit 52 determines that overflow of the layer 2 transmission buffer 14 occurs (Yes in step S503), the overflow determination unit 52 sets "1" to the overflow flag (step S504). On the other hand, when the overflow determination unit 52 determines that overflow of the layer 2 transmission buffer 14 does not occur (No in step S503), the processing of step S504 is not executed. After that, the flow returns to step S201.

After the processing of the communication state monitoring unit 51 in step S205 when an ACK packet is input from the communication unit 11 (Yes in step S101), the window size change unit 53 checks the state of the overflow flag (step S505).

When the overflow flag is "1" (Yes in step S505), the window size change unit 53 changes a window size that has been notified from the communication device 3 to a free space of the layer 2 transmission buffer 14 (step S103), and set "0" to the overflow flag (step S506). In addition, the window size change unit 53 transfers the ACK packet after the window size has been changed, to the packet processing unit 15 (step S104).

On the other hand, when the overflow flag is "0" (No in step S505), the window size change unit 53 transfers the ACK packet that has been input from the communication unit 11, to the packet processing unit 15 as is (step S104).

After the processing of step S104, the flow returns to step S201.

As described above, in the embodiment, the overflow determination unit 52 determines whether or not overflow of the layer 2 transmission buffer 14 occurs, based on a free space of the layer 2 transmission buffer 14, the most recent transmitted data amount from the communication device 50 before cut-off of the communication with the communication device 3, and the most recent received data amount by the communication device 3 before the cut-off of the communication with the communication device 3.

Therefore, after the cut-off of the communication with the communication device 3, the occurrence of overflow in the layer 2 transmission buffer 14 may be predicted before recovery of the communication from the cut-off, so that a processing load after the communication is recovered from the cut-off may be reduced.

Sixth Embodiment

Configuration of Communication Device

Figure 14:
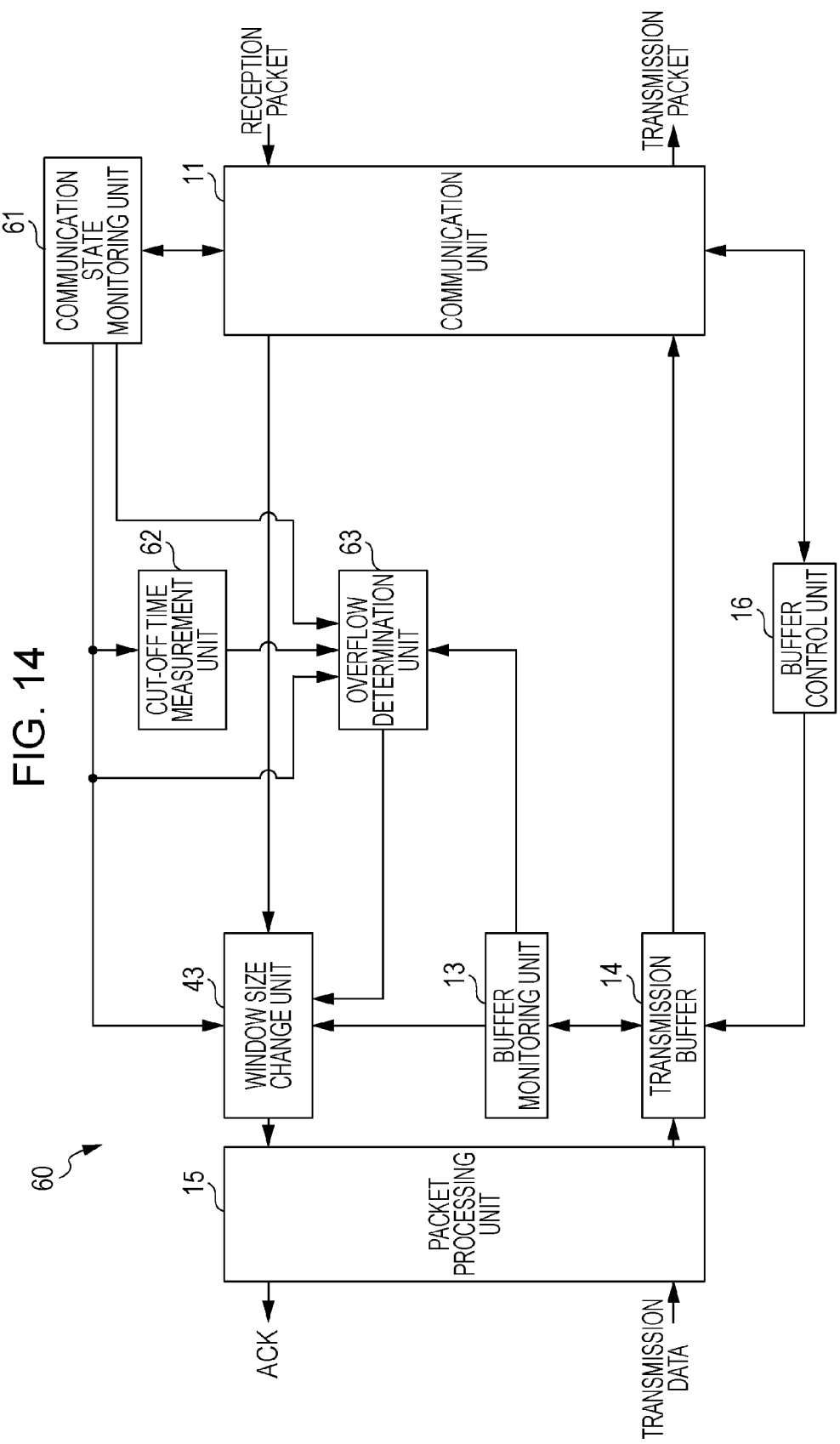
FIG. 14 is a diagram illustrating an example of a functional configuration of a communication device, according to a sixth embodiment.

FIG. 14 is a diagram illustrating an example of a functional configuration of a communication device, according to a sixth embodiment. A communication device 60 illustrated in FIG. 14 corresponds to the communication device 2 illustrated in FIG. 2. The communication device 60 includes a communication state monitoring unit 61, a cut-off time measurement unit 62, and an overflow determination unit 63.

The communication state monitoring unit 61 executes the following processing in addition to the processing that is executed by the communication state monitoring unit 21 according to the second embodiment. That is, the communication state monitoring unit 61 monitors communication with the communication device 3, which is performed by the communication unit 11, and measures the transmission rate of a transmission packet. In addition, the communication state monitoring unit 61 detects cut-off of the communication and recovery of the communication from the cut-off, and outputs the detection result to the cut-off time measurement unit 62 and the overflow determination unit 63.

The cut-off time measurement unit 62 measures a time from cut-off of the communication to recovery of the communication from the cut-off (that is, communication cut-off time).

When a detection result that indicates that the communication with the communication device 3 is cut off is input from the communication state monitoring unit 61, the overflow determination unit 63 obtains a transmission rate that has been measured just before cut-off of the communication, from the communication state monitoring unit 61. In addition, when a detection result that indicates that the communication with the communication device 3 is recovered from cut-off is input from the communication state monitoring unit 61, the overflow determination unit 63 obtains a communication cut-off time from the cut-off time measurement unit 62, and obtains a free space of the layer 2 transmission buffer 14 from the buffer monitoring unit 13. In addition, the overflow determination unit 63 determines that overflow of the layer 2 transmission buffer 14 occurs when the condition of the formula (4) is satisfied, determines that overflow of the layer 2 transmission buffer 14 does not occur when the condition of the formula (4) is not satisfied, and outputs the determination result to the window size change unit 43.

$$\text{The free space of the layer 2 transmission buffer 14 [byte]} < \text{transmission rate [byte/sec]} \times \text{communication cut-off time [sec]} \quad (4)$$

<Processing of Communication Device>

Figure 15:
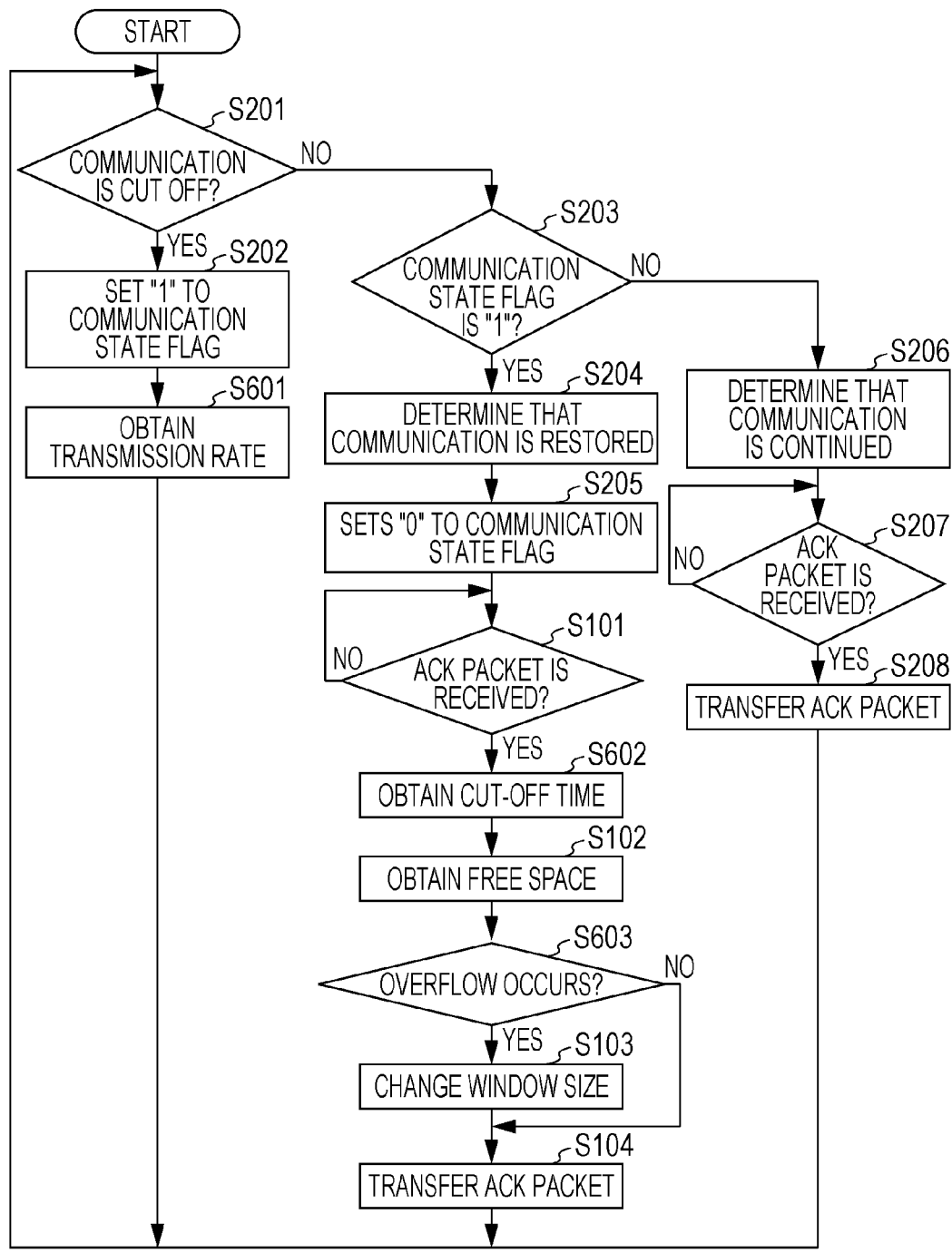
FIG. 15 is a diagram illustrating an example of an operational flowchart for processing of a communication device, according to a sixth embodiment.

FIG. 15 is a diagram illustrating an example of an operational flowchart for processing of a communication device, according to a sixth embodiment. The flowchart illustrated in FIG. 15 is started when power source of the communication device 60 is turned on, and is terminated when the power source is turned off. When the flowchart of FIG. 15 is started, the communication state flag is set at an initial value of "0".

When the communication state monitoring unit 61 detects cut-off of communication (Yes in step S201), the overflow determination unit 63 obtains a transmission rate that has been measured just before cut-off of the communication from the communication state monitoring unit 61 (step S601). After the processing of step S601, the flow returns to step S201.

When the communication state monitoring unit 61 detects recovery of the communication from cut-off (step S204), the overflow determination unit 63 obtains a communication cut-off time from the cut-off time measurement unit 62 (step S602), and obtains a free space of the layer 2 transmission buffer 14 from the buffer monitoring unit 13 (step S102).

After that, the overflow determination unit 63 determines whether or not overflow of the layer 2 transmission buffer 14 occurs (step S603). That is, the overflow determination unit 63 determines that overflow of the layer 2 transmission buffer 14 occurs when the condition that is indicated in the formula (4) is satisfied, and determines that overflow of the layer 2 transmission buffer 14 does not occur when the condition that is indicated in the formula (4) is not satisfied.

When the overflow determination unit 63 determines that overflow of the layer 2 transmission buffer 14 occurs (Yes in step S603), the window size change unit 43 changes a window size that has been notified from the communication device 3 to the free space of the layer 2 transmission buffer 14 (step S103). In addition, the window size change unit 43 transfers the ACK packet after the window size has been changed, to the packet processing unit 15 (step S104).

On the other hand, the overflow determination unit 63 determines that overflow of the layer 2 transmission buffer 14 does not occur (No in step S603), the window size change unit 43 transfers the ACK packet that has been input from the communication unit 11, to the packet processing unit 15 as is (step S104).

After the processing of step S104, the flow returns to step S201.

As described above, in the embodiment, the cut-off time measurement unit 62 measures a communication cut-off time in the communication with the communication device 3. The overflow determination unit 63 determines whether or not the overflow of the layer 2 transmission buffer 14 occurs, based on the communication cut-off time.

As the communication cut-off time becomes longer, the number of ACK packets that are burst-transmitted from communication device 3 at the time of recovery of the communication from cut-off is increased. As the number of transmitted ACK packets is burst-increased, a probability of occurrence of overflow of the layer 2 transmission buffer 14 becomes higher. Thus, whether or not overflow of the layer 2 transmission buffer 14 occurs may be determined only based on information that is obtained through relatively simply processing, by determining whether or not overflow of the layer 2 transmission buffer 14 occurs based on the communication cut-off time.

Seventh Embodiment

Configuration of Communication Device

Figure 16:
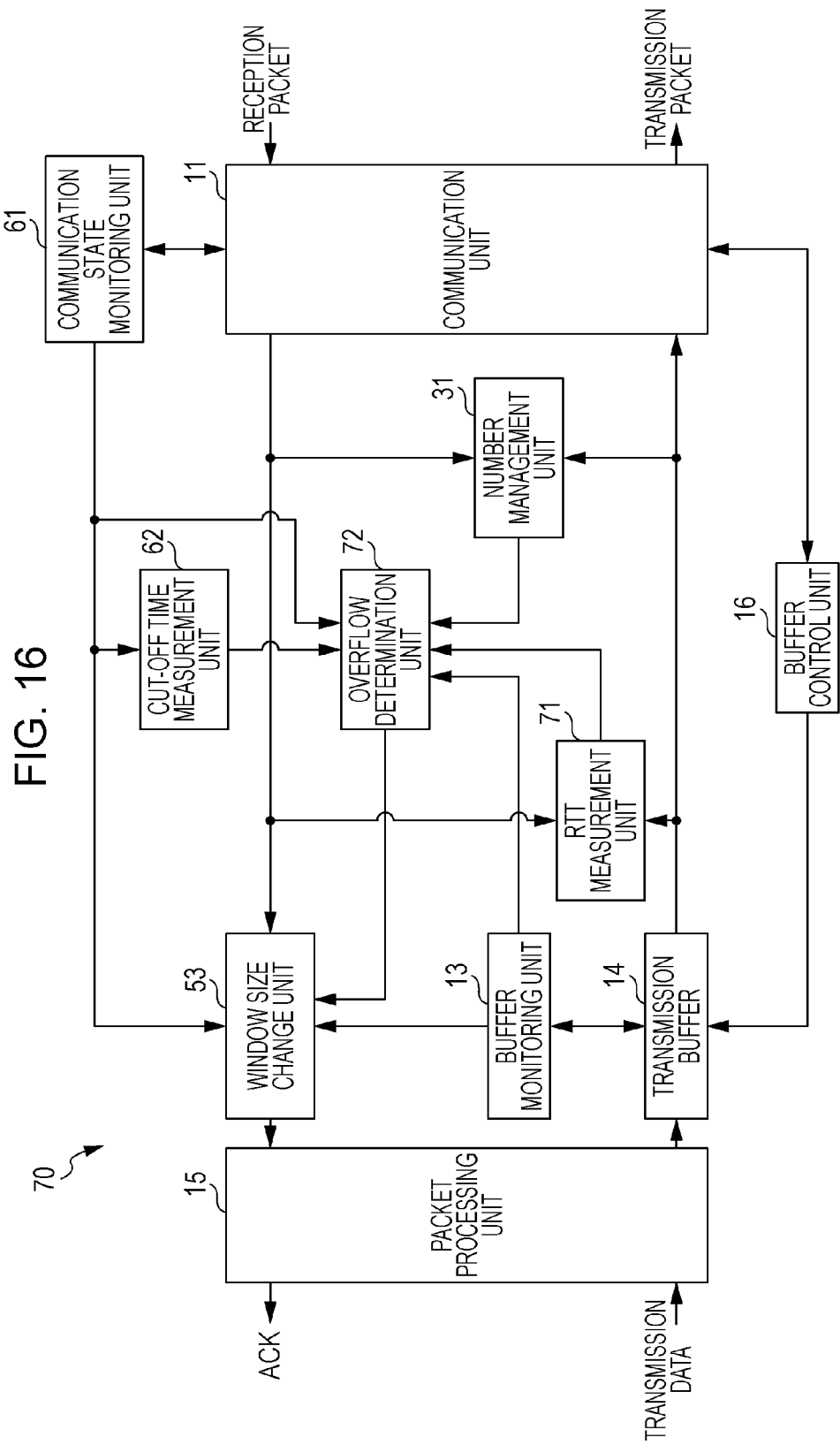
FIG. 16 is a diagram illustrating an example of a functional configuration of a communication device, according to a seventh embodiment.

FIG. 16 is a diagram illustrating an example of a functional configuration of a communication device, according to a seventh embodiment. A communication device 70 illustrated in FIG. 16 corresponds to the communication device 2 illustrated in FIG. 2. The communication device 70 includes a round-trip time (RTT) measurement unit 71 and an overflow determination unit 72.

The RTT measurement unit 71 measures an RTT. For example, to the RTT measurement unit 71, a transmission packet that has been output from the layer 2 transmission buffer 14 is input, and to the RTT measurement unit 71, an ACK packet that has been output from the communication unit 11 is input. In addition, the RTT measurement unit 71 identifies an ACK packet that corresponds to the transmission packet from a sequence number of the transmission packet and an ACK number of the ACK packet, and may measure a time from transmission of the transmission packet to reception of the corresponding ACK packet, as an RTT.

The overflow determination unit 72 executes the following processing in addition to the processing that is executed by the overflow determination unit 52 according to the fifth embodiment and the processing that is executed by the overflow determination unit 63 according to the sixth embodiment. That is, the overflow determination unit 72 obtains an RTT from the RTT measurement unit 71 when a detection result that indicates that communication with the communication device 3 is recovered from cut-off is input from the communication state monitoring unit 61. In addition, when the communication cut-off time is the RTT or more, the overflow determination unit 72 determines whether or not overflow of the layer 2 transmission buffer 14 occurs, in accordance with the formula (3) in the fifth embodiment. On the other hand, when the communication cut-off time is less than the RTT, the overflow determination unit 72 determines whether or not overflow of the layer 2 transmission buffer 14 occurs, in accordance with the formula (4) in the sixth embodiment. In addition, the overflow determination unit 72 outputs the determination result to the window size change unit 53.

<Configuration of Communication Device>

Figure 17:
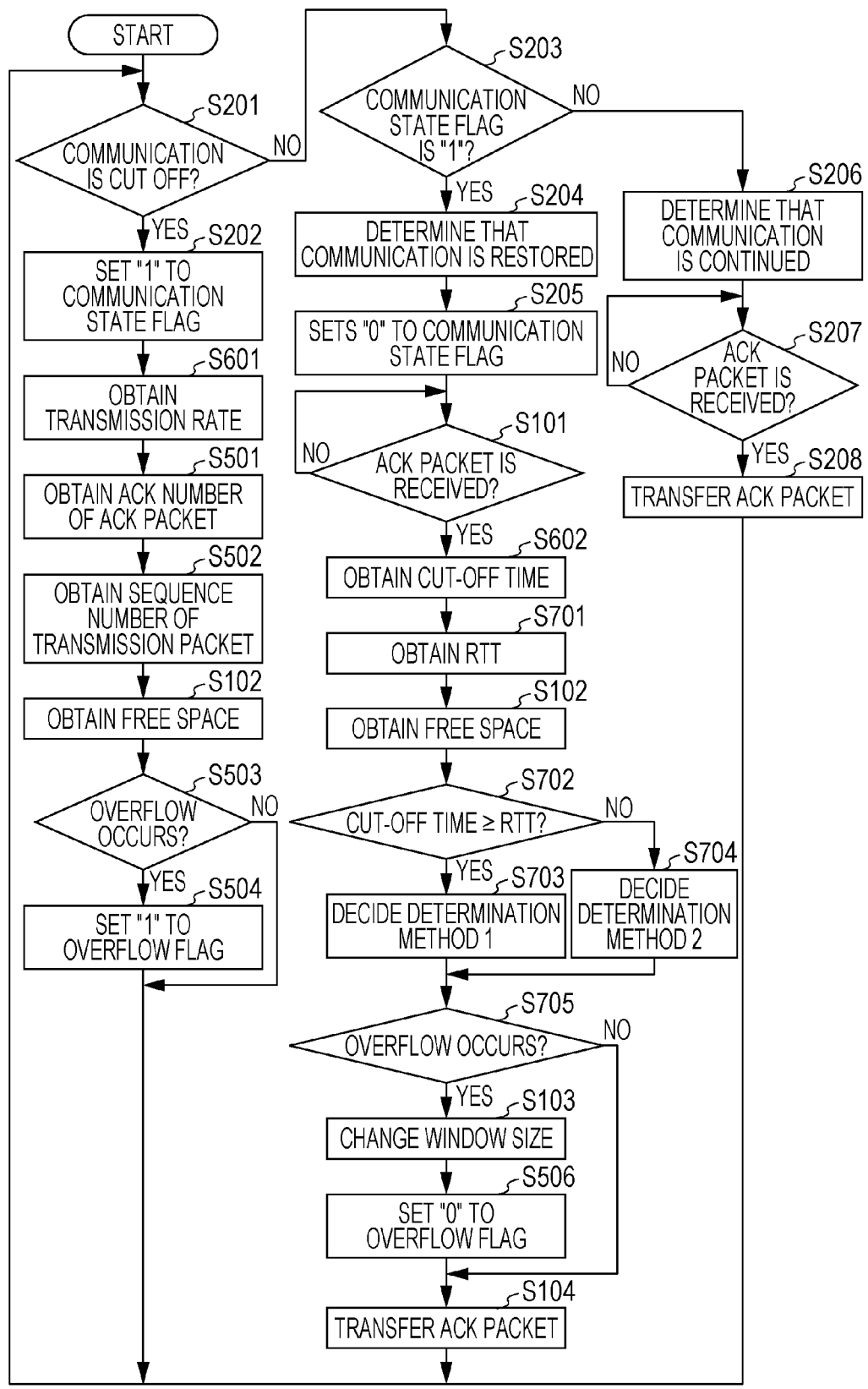
FIG. 17 is a diagram illustrating an example of an operational flowchart for processing of a communication device, according to a seventh embodiment.

FIG. 17 is a diagram illustrating an example of an operational flowchart for processing of a communication device, according to a seventh embodiment. The flowchart illustrated in FIG. 17 is started when power source of the communication device 70 is turned on, and is terminated when the power source is turned off. When the flowchart of FIG. 17 is started, the communication state flag and the overflow flag are set at an initial value of "0".

In step S701, the overflow determination unit 72 measures an RTT from the RTT measurement unit 71.

In step S702, the overflow determination unit 72 determines whether or not a communication cut-off time is the RTT or more. When the overflow determination unit 72 determines the communication cut-off time is the RTT or more (Yes in step S702), the overflow determination unit 72 decides "determination method 1", that is, a method of performing the determination in accordance with the formula (3) in the fifth embodiment, as an overflow determination method (step S703). On the other hand, when the communication cut-off time is less than the RTT (No in step S702), the overflow determination unit 72 decides "determination method 2", that is, a method of performing the determination in accordance with the formula (4) in the sixth embodiment, as the overflow determination method (step S704).

In addition, in step S705, the overflow determination unit 72 determines whether or not overflow of the layer 2 transmission buffer 14 occurs, using the determination method 1 or determination method 2.

As described above, in the embodiment, the RTT measurement unit 71 measures a RTT. When a communication cut-off time is the RTT or more, the overflow determination unit 72 determines whether or not overflow of the layer 2 transmission buffer 14 occurs in accordance with the formula (3) in the fifth embodiment. In addition, when the communication cut-off time is less than the RTT, the overflow determination unit 72 determines whether or not overflow of the layer 2 transmission buffer 14 occurs, in accordance with the formula (4) in the sixth embodiment.

In the determination in accordance with the formula (3) in the fifth embodiment, accuracy of the determination is reduced when the communication cut-off time is less than the RTT, but in the determination in accordance with the formula (4) in the sixth embodiment, accuracy of the determination is reduced when the communication cut-off time is the RTT or more. Thus, as described above, accuracy of the determination may be maintained by separately using the determination in accordance with the formula (3) in the fifth embodiment and the determination in accordance with the formula (4) in the sixth embodiment, depending on an RTT as a threshold value.

Further Embodiments

Figure 18:
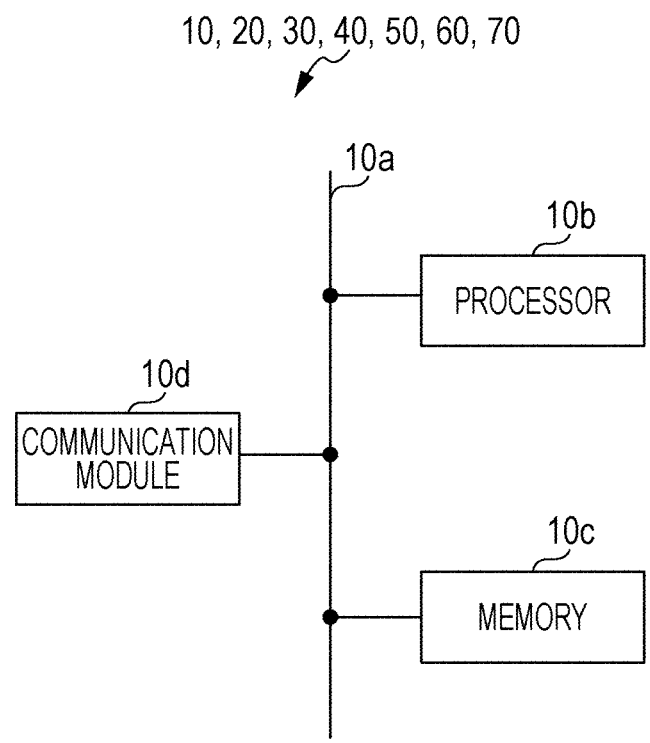
FIG. 18 is a diagram illustrating an example of a hardware configuration of a communication device, according to an embodiment.

[1] The communication devices 10, 20, 30, 40, 50, 60, and 70 according to the above-described embodiments may be obtained by the following hardware configuration. FIG. 18 is a diagram illustrating an example of a hardware configuration of a communication device, according to an embodiment. As illustrated in FIG. 18, each of the communication devices 10, 20, 30, 40, 50, 60, and 70 includes a bus 10a, a processor 10b, a memory 10c, and a communication module 10d as a configuration element of hardware. Examples of the processor 10b include a central processing unit (CPU), a digital signal processor (DSP), a field programmable gate array (FPGA), and the like. In addition, each of the communication devices 10, 20, 30, 40, 50, 60, and 70 may include a large scale integrated circuit (LSI) that includes the processor 10b and the peripheral circuit. Examples of the memory 10c include a random-access memory (RAM) such as a synchronous dynamic RAM (SDRAM), a read-only memory (ROM), a flash memory, and the like. The communication unit 11 is implemented by the communication module 10d. The layer 2 transmission buffer 14 is implemented by the memory 10c. Each of the window size change units 12, 22, 32, 43, and 53, the buffer monitoring unit 13, the packet processing unit 15, the buffer control unit 16, the communication state monitoring units 21, 41, 51, and 61, the overflow determination units 42, 52, 63, and 72, the cut-off time measurement unit 62, and the RTT measurement unit 71 is implemented by the processor 10b. The number management unit 31 is implemented by the processor 10b and the memory 10c.

[2] Each of the above-described pieces of processing in the window size change units 12, 22, 32, 43, and 53, the buffer monitoring unit 13, the packet processing unit 15, the buffer control unit 16, the communication state monitoring units 21, 41, 51, and 61, the overflow determination units 42, 52, 63, and 72, the cut-off time measurement unit 62, the RTT measurement unit 71, and the number management unit 31 may be achieved by causing the processor 10b to execute a program that corresponds to each of the pieces of processing. For example, the program that corresponds each of the above-described pieces of processing in the window size change units 12, 22, 32, 43, and 53, the buffer monitoring unit 13, the packet processing unit 15, the buffer control unit 16, the communication state monitoring units 21, 41, 51, and 61, the overflow determination units 42, 52, 63, and 72, the cut-off time measurement unit 62, the RTT measurement unit 71, the number management unit 31 is stored in the memory 10c, and the program may be executed so as to be read from the memory 10c by the processor 10b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device disposed on a transfer path of Transmission Control Protocol (TCP) packets, the communication device comprising:
   a memory configured to include a layer 2 transmission buffer in which packets that are to be transmitted to another communication device according to a Transmission Control Protocol (TCP) are temporarily stored so as to be subjected to processing for a data link layer;
   a processor coupled to the memory, the processor being configured:
   to control an inflow of packets to the layer 2 transmission buffer, in accordance with a first window size set in a TCP header of an Acknowledgement (ACK) packet received from the another communication device, to monitor a free space of the layer 2 transmission buffer, and to, upon receiving from the another communication device the ACK packet including the TCP header in which the first window size is set, overwrite the first window size set in the TCP header of the received ACK packet with a second window size, based on the free space of the layer 2 transmission buffer so as to control the inflow of the transmission packets to the layer 2 transmission buffer, in accordance with the second window size.

2. The communication device of claim 1, wherein
the processor is further configured to monitor a state of communication with the another communication device, and to detect cut-off of the communication and recovery of the communication from the cut-off; and
the processor overwrites the first window size with the second window size when the recovery is detected.

3. The communication device of claim 2, wherein
the processor calculates the second window size, based on the free space, an amount of data that have been most recently transmitted from the communication device before the cut-off, and an amount of data that have been most recently received by the another communication device before the cut-off.

4. The communication device of claim 2, wherein
the processor is further configured to determine whether or not overflow of the buffer occurs; and
the processor overwrites the first window size with the second window size upon determining that the overflow occurs.

5. The communication device of claim 4, wherein
the processor determines whether or not the overflow occurs, based on the free space, a transmission rate of the Transmission Control Protocol (TCP) packets, and an increase rate of an ACK number that is received by the communication device.

6. The communication device of claim 4, wherein
the processor determines whether or not the overflow occurs, based on the free space, an amount of data that have been most recently transmitted from the communication device before the cut-off, and an amount of data that have been most recently received by the another communication device before the cut-off.

7. The communication device of claim 4, wherein
the processor is further configured to measure a cut-off time during which the cut-off is being maintained; and
the processor determines whether or not the overflow occurs, based on the cut-off time.

8. The communication device of claim 4, wherein
the processor is further configured:
to measure a cut-off time during which the cut-off is being maintained, and
to measure a round trip time; and
the processor determines, when the cut-off time is the round trip time or more, whether or not the overflow occurs, based on the free space, an amount of data that have been most recently transmitted from the communication device before the cut-off, and an amount of data that have been most recently received by the another communication device before the cut-off, and determines, when the cut-off time is less than the round trip time, whether or not the overflow occurs, based on the cut-off time.

9. The communication device of claim 1, wherein
the processor sets the second window size at a value of the free space.

10. A packet control method performed by a communication device disposed on a transfer path of Transmission Control Protocol (TCP) packets, the packet control method comprising:
providing a layer 2 transmission buffer in which packets that are to be transmitted to another communication device according to a Transmission Control Protocol (TCP) are temporarily stored so as to be subjected to processing for a data link layer;
controlling an inflow of packets to the layer 2 transmission buffer, in accordance with a first window size set in a TCP header of an Acknowledgement (ACK) packet received from the another communication device;
monitoring a free space of the layer 2 transmission buffer; and
upon receiving, from the another communication device, the ACK packet including the TCP header in which the first window size is set, overwriting the first window size set in the TCP header of the received ACK packet with a second window size, based on the free space of the layer 2 transmission buffer so as to control the inflow of packets to the layer 2 transmission buffer, in accordance with the second window size.

* * * * *